United States Patent
Ware et al.

(10) Patent No.: US 11,194,585 B2
(45) Date of Patent: Dec. 7, 2021

(54) MULTIPLIER-ACCUMULATOR CIRCUITRY HAVING PROCESSING PIPELINES AND METHODS OF OPERATING SAME

(71) Applicant: Flex Logix Technologies, Inc., Mountain View, CA (US)

(72) Inventors: Frederick A. Ware, Los Altos Hills, CA (US); Cheng C. Wang, San Jose, CA (US)

(73) Assignee: Flex Logix Technologies, Inc., Mountain View, CA (US)

(*) Notice: Subject to any disclaimer, the term of this patent is extended or adjusted under 35 U.S.C. 154(b) by 106 days.

(21) Appl. No.: 16/796,111

(22) Filed: Feb. 20, 2020

(65) Prior Publication Data
US 2020/0310818 A1   Oct. 1, 2020

Related U.S. Application Data

(60) Provisional application No. 62/823,161, filed on Mar. 25, 2019.

(51) Int. Cl.
G06F 9/30       (2018.01)
G06F 9/38       (2018.01)

(52) U.S. Cl.
CPC .......... *G06F 9/3869* (2013.01); *G06F 9/3893* (2013.01)

(58) Field of Classification Search
None
See application file for complete search history.

(56) References Cited

U.S. PATENT DOCUMENTS 4,958,312 A   9/1990 Ang et al.
6,115,729 A   9/2000 Matheny et al.
(Continued)

FOREIGN PATENT DOCUMENTS

EP    0405726       3/1999
EP    2280341       6/2013
WO    WO 2018/126073   7/2018

OTHER PUBLICATIONS

Priyanka Nain, "Multiplier-Accumulator (MAC) Unit", IJDACR, vol. 5, Issue 3, Oct. 2016, 4 pages.
(Continued)

*Primary Examiner* — Corey S Faherty
(74) *Attorney, Agent, or Firm* — Neil A. Steinberg

(57) ABSTRACT

An integrated circuit including memory to store image data and filter weights, and a plurality of multiplier-accumulator execution pipelines, each multiplier-accumulator execution pipeline coupled to the memory to receive (i) image data and (ii) filter weights, wherein each multiplier-accumulator execution pipeline processes the image data, using associated filter weights, via a plurality of multiply and accumulate operations. In one embodiment, the multiplier-accumulator circuitry of each multiplier-accumulator execution pipeline, in operation, receives a different set of image data, each set including a plurality of image data, and, using filter weights associated with the received set of image data, processes the set of image data associated therewith, via performing a plurality of multiply and accumulate operations concurrently with the multiplier-accumulator circuitry of the other multiplier-accumulator execution pipelines, to generate output data. Each set of image data includes all of the image that correlates to the output data generated therefrom.

18 Claims, 31 Drawing Sheets

Exemplary dij-to-eij conversion/extraction embodiment of execution pipeline

(56) References Cited

U.S. PATENT DOCUMENTS

| | | | |
|---|---|---|---|
| 6,148,101 A | 11/2000 | Tanaka et al. | |
| 6,298,366 B1 | 10/2001 | Gatherer et al. | |
| 6,385,634 B1* | 5/2002 | Peleg | G06F 9/30112 708/490 |
| 7,085,795 B2* | 8/2006 | Debes | G06F 9/30014 708/319 |
| 7,107,305 B2 | 9/2006 | Deng et al. | |
| 7,299,342 B2 | 11/2007 | Nilsson et al. | |
| 7,346,644 B1 | 3/2008 | Langhammer et al. | |
| 7,624,138 B2* | 11/2009 | Debes | G06F 9/30014 708/523 |
| 7,698,358 B1 | 4/2010 | Langhammer et al. | |
| 8,051,124 B2 | 11/2011 | Salama et al. | |
| 8,271,571 B2* | 9/2012 | Matsuyama | G06F 9/3001 708/622 |
| 8,645,450 B1 | 2/2014 | Choe et al. | |
| 8,751,551 B2 | 6/2014 | Streicher | |
| 8,788,562 B2 | 7/2014 | Langhammer et al. | |
| 2002/0065860 A1* | 5/2002 | Grisenthwaite | G06F 9/30036 708/207 |
| 2003/0172101 A1 | 9/2003 | Liao et al. | |
| 2004/0073589 A1* | 4/2004 | Debes | G06F 9/30032 708/523 |
| 2007/0239967 A1 | 10/2007 | Dally et al. | |
| 2009/0094303 A1 | 4/2009 | Katayama | |
| 2014/0019727 A1 | 1/2014 | Zhu et al. | |
| 2017/0115958 A1 | 4/2017 | Hammer | |
| 2017/0116693 A1 | 4/2017 | Rae et al. | |
| 2017/0214929 A1 | 7/2017 | Susnow et al. | |
| 2017/0322813 A1 | 11/2017 | Hammer | |
| 2017/0344876 A1 | 11/2017 | Brothers | |
| 2018/0052661 A1 | 2/2018 | Langhammer | |
| 2018/0081632 A1 | 3/2018 | Langhammer | |
| 2018/0081633 A1 | 3/2018 | Langhammer | |
| 2018/0189651 A1 | 7/2018 | Henry et al. | |
| 2018/0300105 A1 | 10/2018 | Langhammer | |
| 2018/0321909 A1 | 11/2018 | Langhammer | |
| 2018/0321910 A1 | 11/2018 | Langhammer et al. | |
| 2018/0341460 A1 | 11/2018 | Langhammer | |
| 2018/0341461 A1 | 11/2018 | Langhammer | |
| 2019/0042191 A1 | 2/2019 | Langhammer | |
| 2019/0079728 A1 | 3/2019 | Langhammer et al. | |
| 2019/0196786 A1 | 6/2019 | Langhammer | |
| 2019/0243610 A1 | 8/2019 | Lin et al. | |
| 2019/0250886 A1 | 8/2019 | Langhammer | |
| 2019/0286417 A1 | 9/2019 | Langhammer | |
| 2019/0310828 A1 | 10/2019 | Langhammer et al. | |
| 2019/0324722 A1 | 10/2019 | Langhammer | |
| 2020/0004506 A1 | 1/2020 | Langhammer et al. | |
| 2020/0026493 A1 | 1/2020 | Streicher et al. | |
| 2020/0174750 A1 | 6/2020 | Langhammer | |
| 2020/0326948 A1 | 10/2020 | Langhammer | |

OTHER PUBLICATIONS

Agrawal et al., "A 7nm 4-Core AI Chip with 25.6TFLOPS Hybrid FP8 Training, 102.4TOPS INT4 Inference and Workload-Aware Throttling", ISSCC, pp. 144-145, 2021.

Linley Gwennap, "IBM Demonstrates New AI Data Types", Microprocessor Report, Apr. 2021.

Choi et al., "Accurate and Efficient 2-Bit Quantized Neural Networks", Proceedings of $2^{nd}$ SysML Conf, 2019, 12 pages.

Sun et al., "Hybrid 8-bit Floating Point (HFP8) Training and Inference for Deep Neural Networks", NeurIPS 2019, 10 pages.

"NVidia A100 Tensor Core GPU Architecture", v1.0, 2020, 82 pages.

Papadantonakis et al., "Pipelining Saturated Accumulation", IEEE, vol. 58, No. 2, pp. 208-219, Feb. 2009.

Jebashini et al., "A Survey and Comparative Analysis of Multiply-Accumulate (MAC) Block for Digital Signal Processing Application on ASIC and FPGA", Journal of Applied Science, vol. 15, Issue 7, pp. 934-946, Jul. 2015.

International Search Report and Written Opinion of International Searching Authority re: PCT/US2020/020545, dated May 22, 2020, 11 pages.

\* cited by examiner

Exemplary Pseudo-code of dij-to-eij conversion/extraction embodiment of execution pipeline

```
Pseudo-code
For i=0,Dw-1,2
  For j=0,Dh-1,2
    For l=0,Yd-1
      For m=0,M-1
        Zijlm ← 0
        For k=0,Dd-1
          Eijkm ← FunctionE(Dijkm)
          Hklm  ← FunctionH(Fklm)
          Zijlm ← SumK(Eijkm * Hklm)
          Yijkm ← FunctionY(Zijkm)
```

FIG. 4B

Exemplary Pseudo-code of fij-to-hij conversion/extraction embodiment of execution pipeline

```
Pseudo-code
For i=0,Dw-1,2
  For j=0,Dh-1,2
    For l=0,Yd-1
      For m=0,M-1
        Zijlm ← 0
        For k=0,Dd-1
          Eijkm ← FunctionE(Dijkm)
          Hklm  ← FunctionH(Fklm)
          Zijlm ← SumK(Eijkm * Hklm)
          Yijkm ← FunctionY(Zijkm)
```

FIG. 3E

Exemplary Pseudo-code of zij-to-yij Insertion/conversion embodiment of execution pipeline

```
Pseudo-code
For i=0,Dw-1,2
 For j=0,Dh-1,2
  For l=0,Yd-1
   For m=0,M-1
    Zijlm ← 0
    For k=0,Dd-1
     Eijkm ← FunctionE(Dijkm)
     Hklm  ← FunctionH(Fklm)
     Zijlm ← SumK(Eijkm * Hklm)
     Yijkm ← FunctionY(Zijkm)
``` loading into the accumulation input port of the zij-to-yij conversion

The worst case H-terms are h11, h21, h12, h22 requiring an additional 9/4 (=2.25) of range – this requires four additional bits in the adder path of the F-to-H converter – two bits for the additional range and two fractional bits to accommodate ½ and ¼ LSB values

FIG. 7A

Key:
black text on white background are added
white text on black background are subtracted

FIG. 7B

Conversion from D to E

The worst case E-terms all require an additional 4x of range – this requires two additional bits in the adder path The D path is already 16b/17b, so the additional range may be accommodated in the existing path Key:
black text on white background are added
white text on black background are subtracted The worst case Y-terms all require an additional 9x of range – this requires four additional bits in the adder path The Y result will match the result of the standard convolution, so no additional storage space is required Conversion Z to Y y11

|     | z00 | z10 | z20 |
| --- | --- | --- | --- |
|     | z01 | z11 | z21 |
|     | z02 | z12 | z22 |
|     |     |     |     | y21

|     |     |     |     |
| --- | --- | --- | --- |
|     | z10 | z20 | z30 |
|     | z11 | z21 | z31 |
|     | z12 | z22 | z32 | y12

|     |     |     |     |
| --- | --- | --- | --- |
|     | z01 | z11 | z21 |
|     | z02 | z12 | z22 |
|     | z03 | z13 | z23 | y22

|     |     |     |     |
| --- | --- | --- | --- |
|     |     | z11 | z21 | z31 |
|     |     | z12 | z22 | z32 |
|     |     | z13 | z23 | z33 |

Key:
black text on white background are added
white text on black background are subtracted

FIG. 7C

MULTIPLIER-ACCUMULATOR CIRCUITRY HAVING PROCESSING PIPELINES AND METHODS OF OPERATING SAME

RELATED APPLICATION

This non-provisional application claims priority to and the benefit of U.S. Provisional Application No. 62/823,161, entitled "Multiplier-Accumulator Circuitry having Processing Pipeline and Methods of Operating and Using Same", filed Mar. 25, 2019. The '161 provisional application is hereby incorporated herein by reference in its entirety.

INTRODUCTION

There are many inventions described and illustrated herein. The present inventions are neither limited to any single aspect nor embodiment thereof, nor to any combinations and/or permutations of such aspects and/or embodiments. Importantly, each of the aspects of the present inventions, and/or embodiments thereof, may be employed alone or in combination with one or more of the other aspects of the present inventions and/or embodiments thereof.

In one aspect, the present inventions are directed to an integrated circuit having multiplier-accumulator circuitry (and methods of operating such circuitry) including one or more execution or processing pipelines that include circuitry to implement Winograd type processes to increase data throughput of the multiplier-accumulator circuitry and processing. In one embodiment, the circuitry and techniques transform input data, which may be stored in memory (e.g., layers consisting of two-dimensional arrays of image pixels), from an M×M matrix to an N×N matrix (where N and M are positive integers, and N is greater than M (e.g., M=3 and N=4)). The circuitry and techniques, in one embodiment, also transform the input weights or weight values, which may also be stored in memory in M×M blocks (e.g., layers consisting of two-dimensional arrays of input weights or values), from an M×M matrix to an N×N matrix or blocks. Here, each M×M matrix or block of filter weights or coefficients is associated with an M×M matrix of the input data. After the aforementioned conversions, the multiplier-accumulator circuitry processes the N×N input data using the associated N×N filter weights or coefficients.

In one embodiment, the multiplier-accumulator circuitry processes the N×N input data using the associated N×N input weights to generate or accumulate output data of a Q×Q matrix. After further processing (e.g., addition and/or subtraction operations), the multiplier-accumulator circuitry generates an output value. That is, the aggregation of the N×N element values by the multiplier-accumulator circuitry (which, in one embodiment, includes N×N execution pipelines) provides or generates the Q×Q output data/pixels. In this embodiment, circuitry external to the N×N execution pipelines generates the final Q×Q output after further transformation/conversion (via Z-to-Y conversion logic circuitry). Here, while N×N product elements/values are accumulated with other N×N product elements/values from other input layers, the individual elements/values are accumulated together into the final Q×Q output pixels until after the Z-to-Y conversion operation has been performed. The Z-to-Y conversion logic circuitry, which in this embodiment is external to the associated N×N execution pipeline, receives the data, transforms that data to generate and output an output value(s) (a P×P matrix, e.g., 1×1 value) which correlates to the multiplication and accumulation processing results of the multiplier-accumulator circuitry of the M×M input data.

As discussed in more detail below, in another embodiment, the Z-to-Y conversion logic circuitry, and operation implemented thereby, is incorporated into the associated execution pipeline. In this embodiment, multiplier-accumulator circuitry may accumulate of the individual elements/values of the N×N execute pipeline within the execution pipeline, so that the data processing is implemented via a single execution pipeline rather than a plurality of execution pipelines (for example, N×N execution pipelines (e.g., 16 execution pipelines)).

Notably, the present inventions may include a plurality of separate multiplier-accumulator circuits and a plurality of registers (including a plurality of shadow registers) that facilitate pipelining of the multiply and accumulate operations. (See, e.g., U.S. patent application Ser. No. 16/545,345 and U.S. Provisional Patent Application No. 62/725,306, entitled "Multiplier-Accumulator Circuit, Logic Tile Architecture for Multiply-Accumulate, and IC including Logic Tile Array", filed Aug. 31, 2018 and Aug. 20, 2019, respectively). The present inventions may be implemented in conjunction with the inventions and/or embodiments of the '306 and '345 applications, which are hereby incorporated by reference in their entirety. Notably, the multiplier-accumulator circuitry described and/or illustrated in the '306 and '345 applications facilitate concatenating the multiply and accumulate operations, and reconfiguring such operations, thereby allowing a plurality of multiplier-accumulator circuits to perform operations more rapidly.

As mentioned above, in one embodiment, the circuitry and techniques of the present inventions reads the M×M blocks of input weights from memory and thereafter transforms or converts such M×M blocks of input weights to N×N blocks that are associated with N×N blocks of input data. In this embodiment, the input data and the input weights are read from memory by the multiplier-accumulator circuitry and transformed or converted during operation of the multiplier-accumulator circuitry/pipeline (i.e., on the fly or during operation of the multiplier-accumulator circuitry/pipeline).

In another embodiment, the input weights are transformed beforehand and stored in memory as N×N blocks. In this alternative embodiment, the transformed or converted filter weights are stored in memory in the N×N block form and then read from memory by the multiplier-accumulator circuitry in the N×N block form. The multiplier-accumulator circuitry employs the pre-transformed/pre-converted weights with the associated input data (that is transformed, on the fly, by the circuitry and techniques of the present inventions from M×M blocks of input data to N×N blocks of input data) during operation and performance of the multiplier-accumulator circuitry/pipeline. Such input weight transformation/conversion may be performed by an off-chip computing system and then stored in memory. Again, however, during operation, the multiplier-accumulator circuitry/pipeline (i.e., on the fly) accumulates N×N product data/elements using the N×N blocks of input weights and associated N×N blocks of input data that are transformed by the circuitry and techniques of the present inventions.

Notably, the integrated circuit may be, for example, a processor, controller, state machine, gate array, system-on-chip (SOC), programmable gate array (PGA) and/or FPGA.

BRIEF DESCRIPTION OF THE DRAWINGS

The present inventions may be implemented in connection with embodiments illustrated in the drawings hereof.

These drawings show different aspects of the present inventions and, where appropriate, reference numerals, nomenclature, or names illustrating like circuits, architectures, structures, components, materials and/or elements in different figures are labeled similarly. It is understood that various combinations of the structures, components, materials and/or elements, other than those specifically shown, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein. Notably, an embodiment or implementation described herein as "exemplary" is not to be construed as preferred or advantageous, for example, over other embodiments or implementations; rather, it is intended reflect or indicate the embodiment(s) is/are "example" embodiment(s).

Notably, the configurations, block/data width, data path width, bandwidths, data lengths, values, processes, pseudo-code, operations, and/or algorithms described herein and/or illustrated in the FIGURES, and text associated therewith, are exemplary. Indeed, the inventions are not limited to any particular or exemplary circuit, logical, block, functional and/or physical diagrams, block/data width, data path width, bandwidths, values, processes, pseudo-code, operations, and/or algorithms illustrated and/or described in accordance with, for example, the exemplary circuit, logical, block, functional and/or physical diagrams.

Figure 1A:
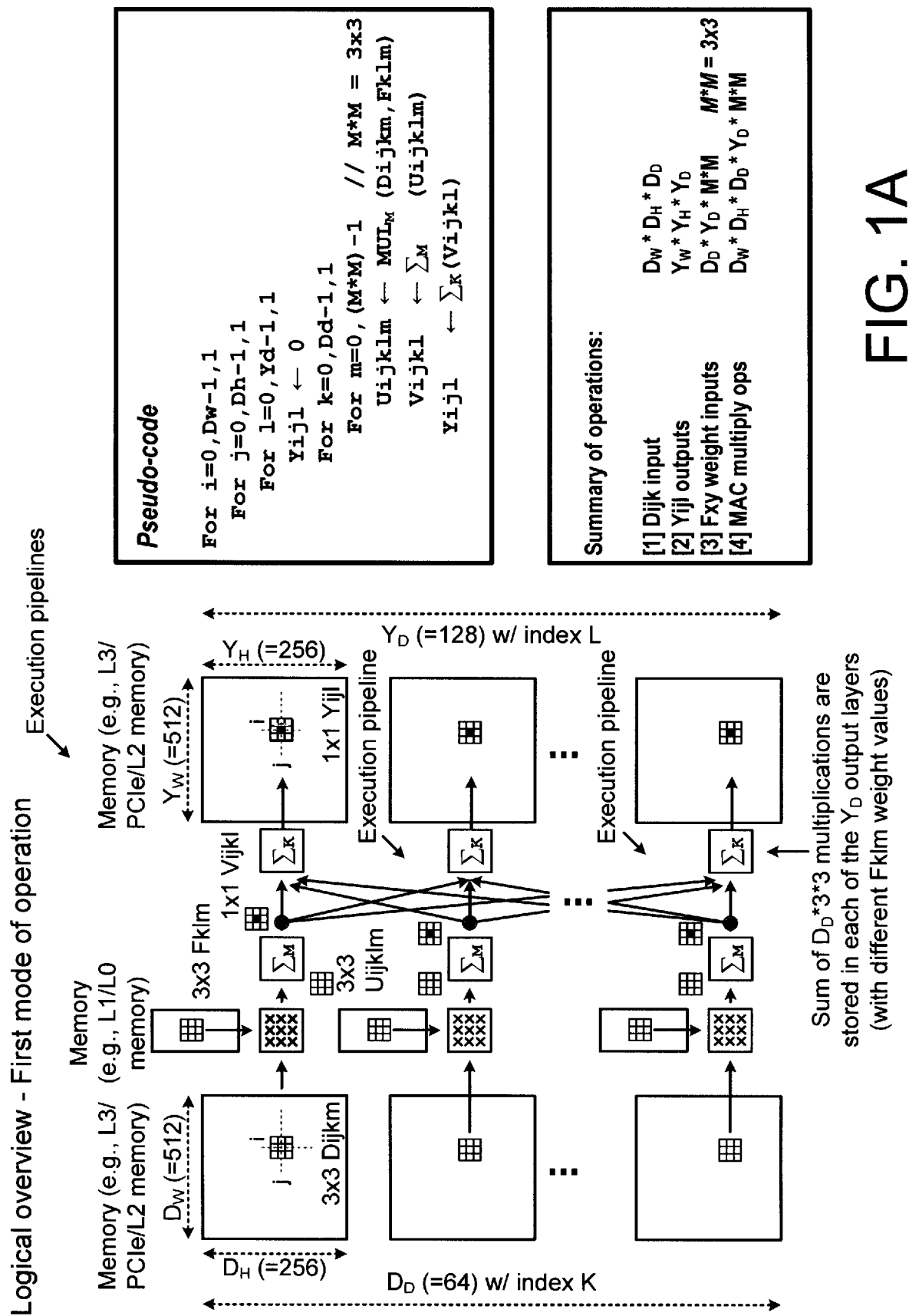
Figure 1B:
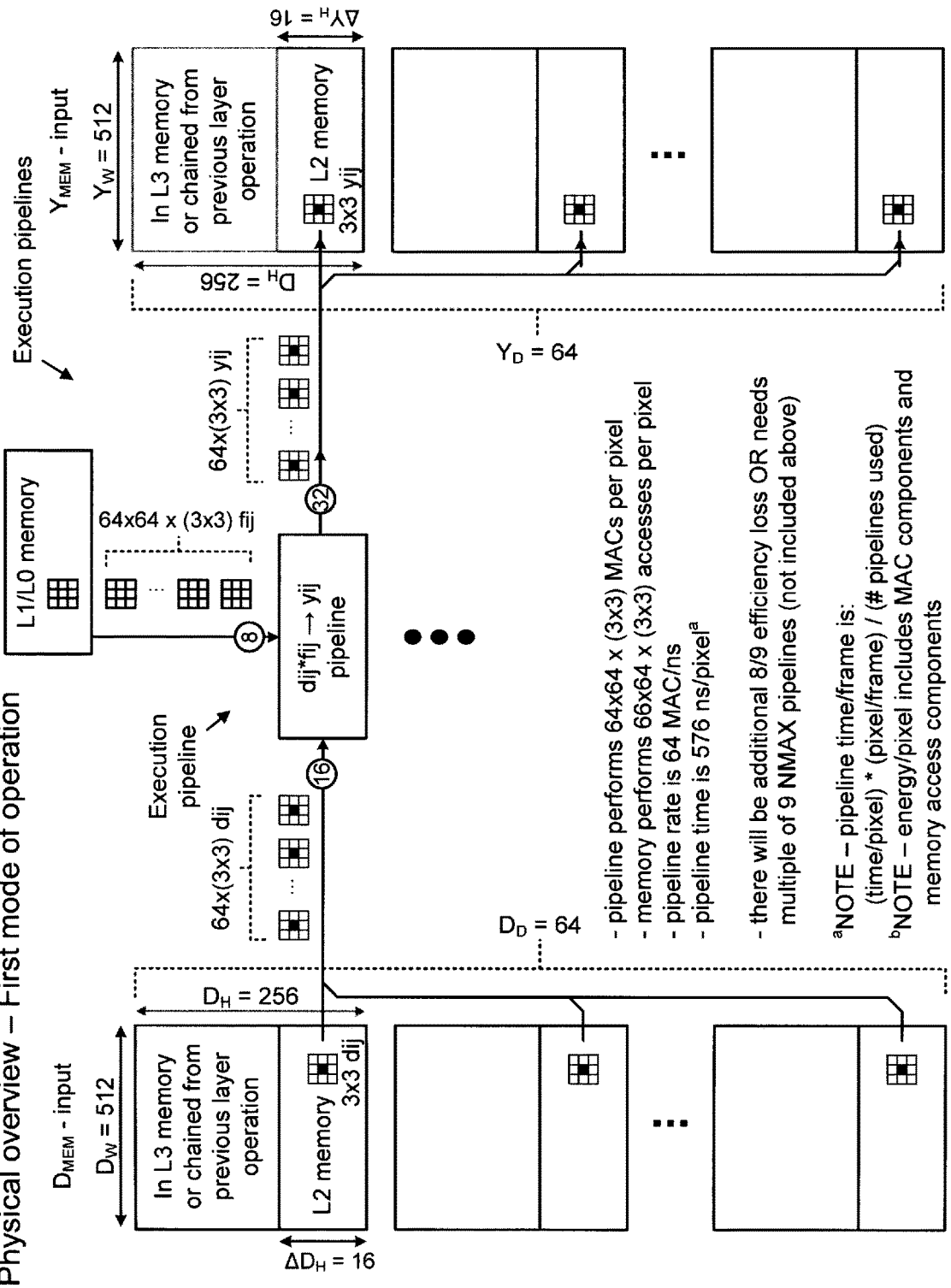
Figure 2A:
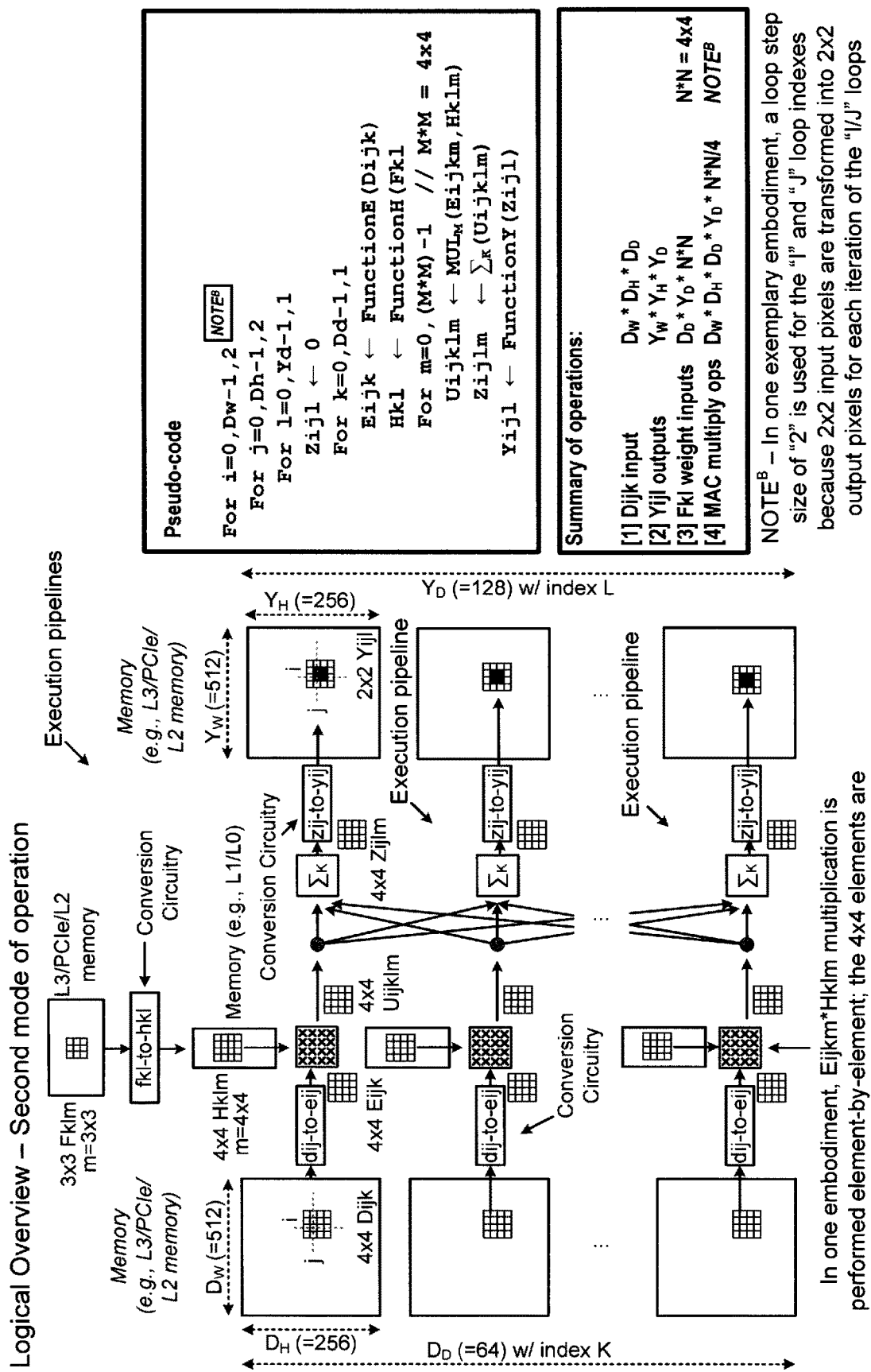
Figure 2B:
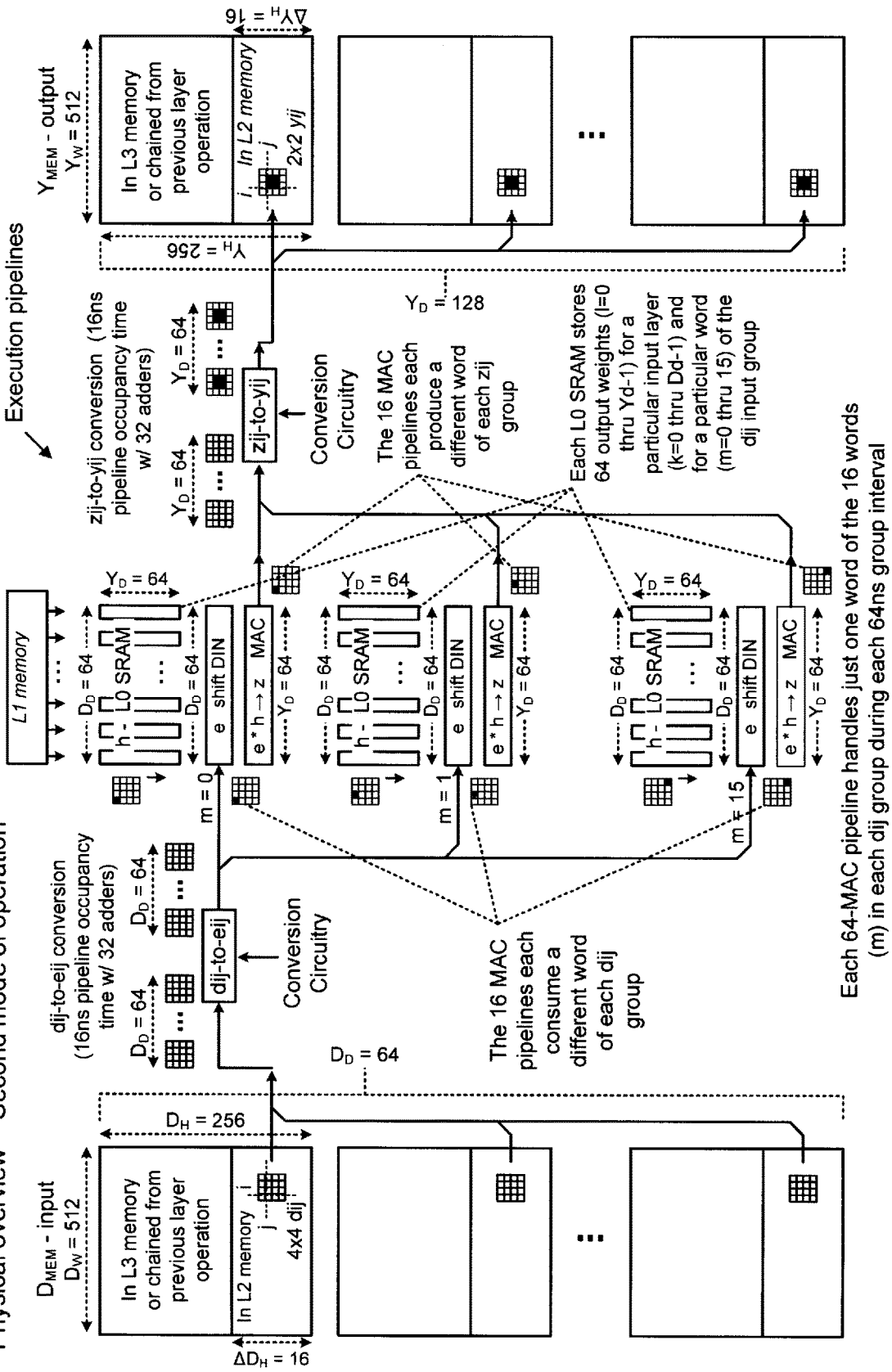
Figure 2C:
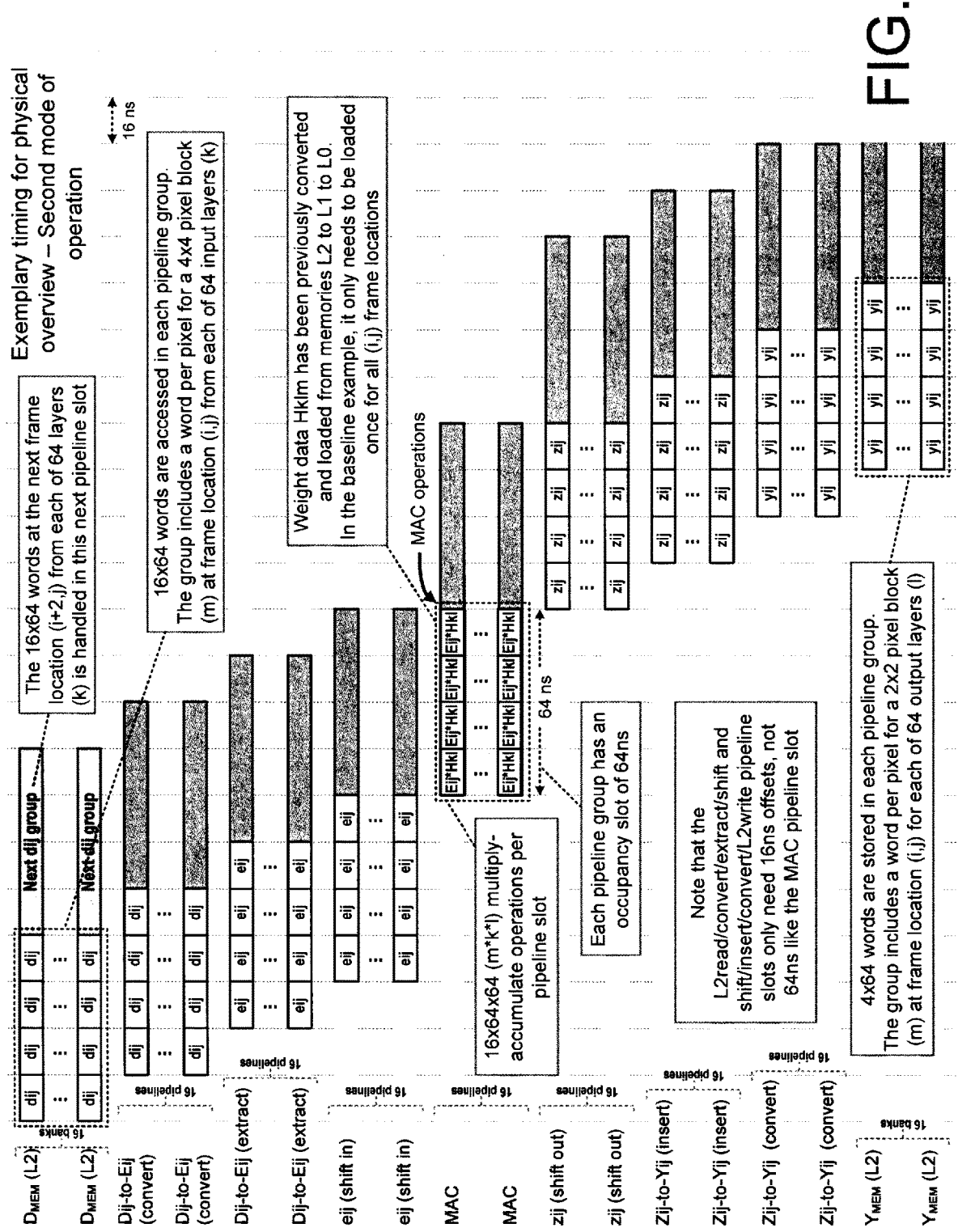
Figure 2D:
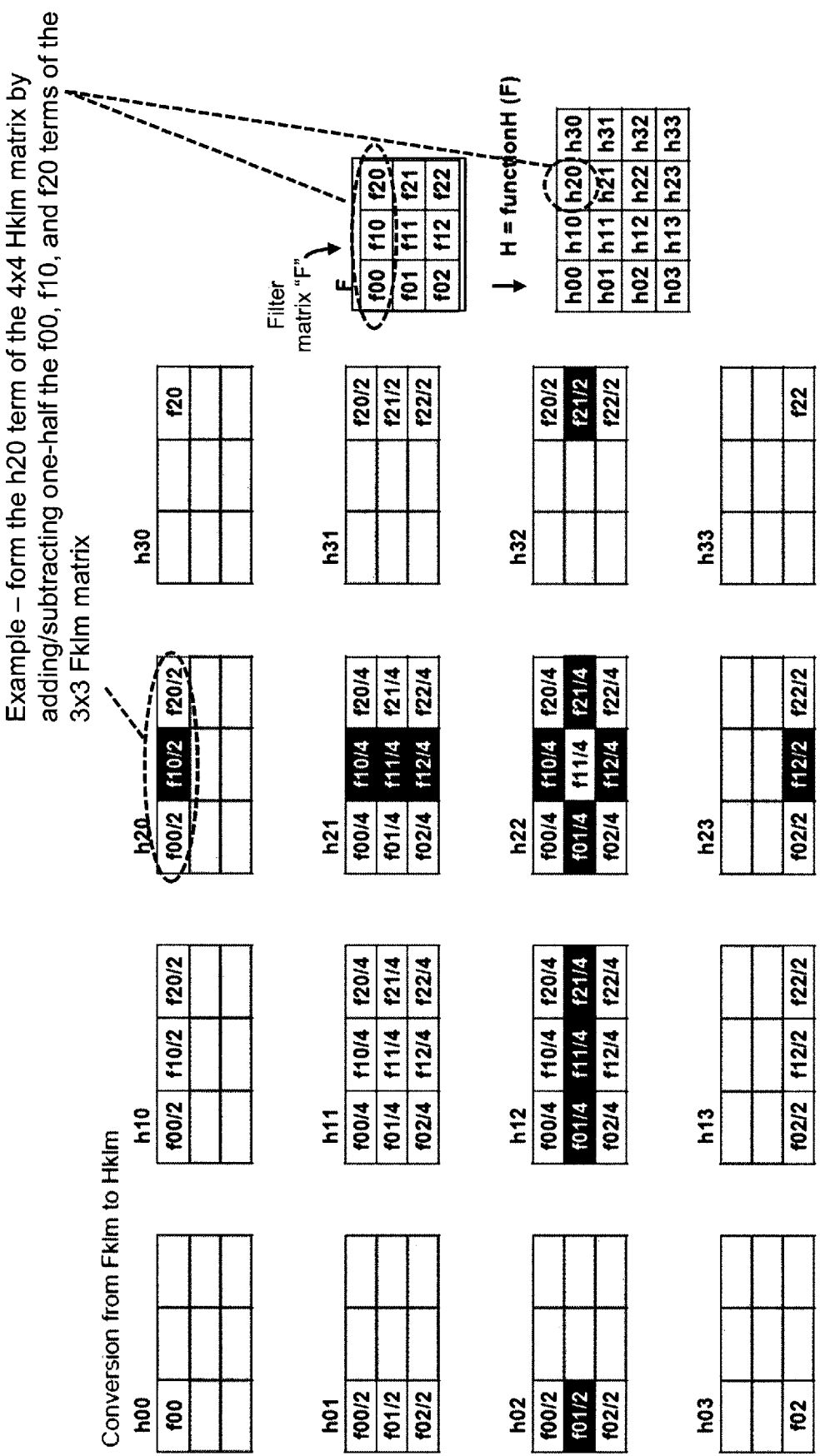
Figure 2E:
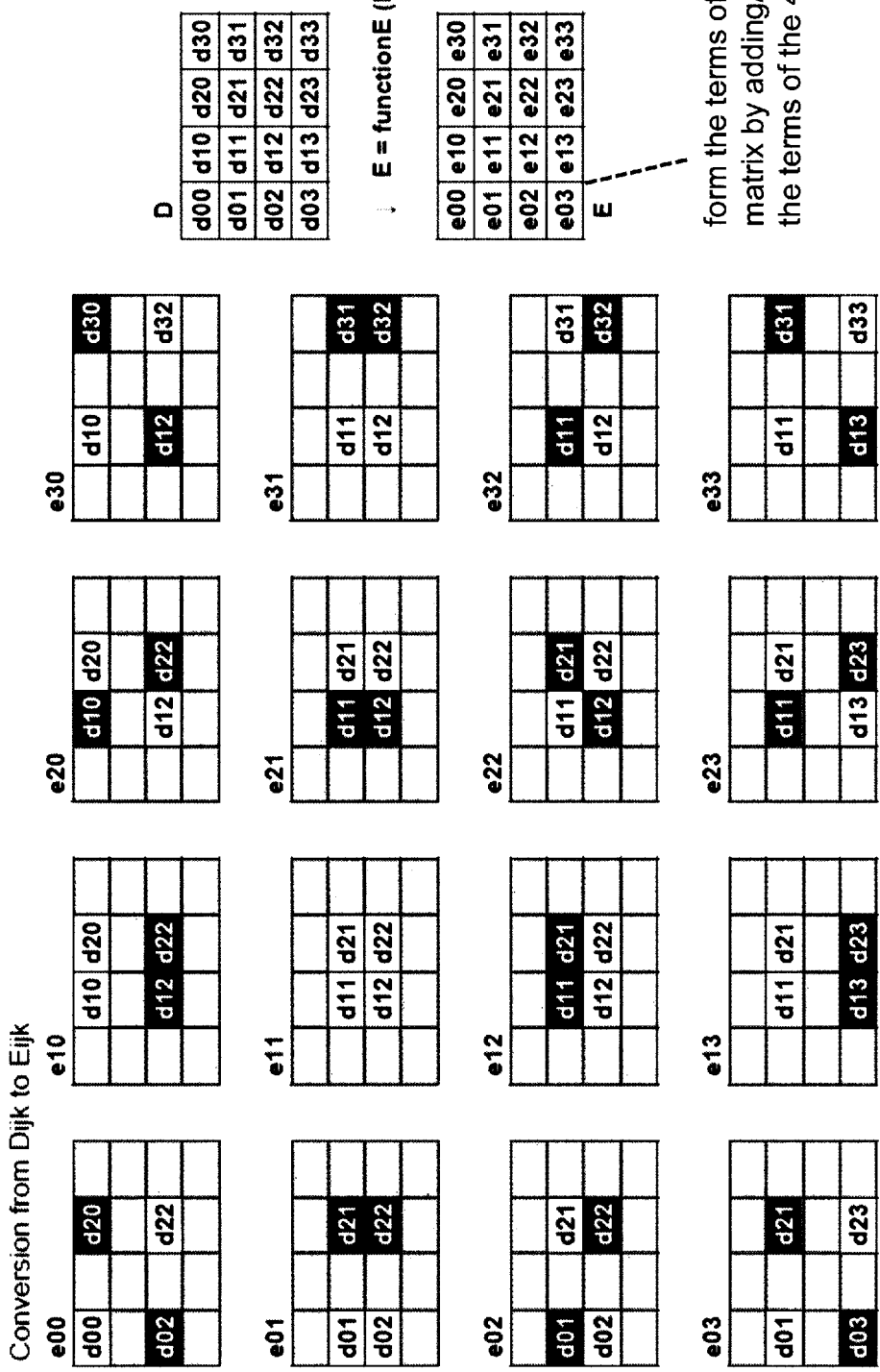
Figure 3A:
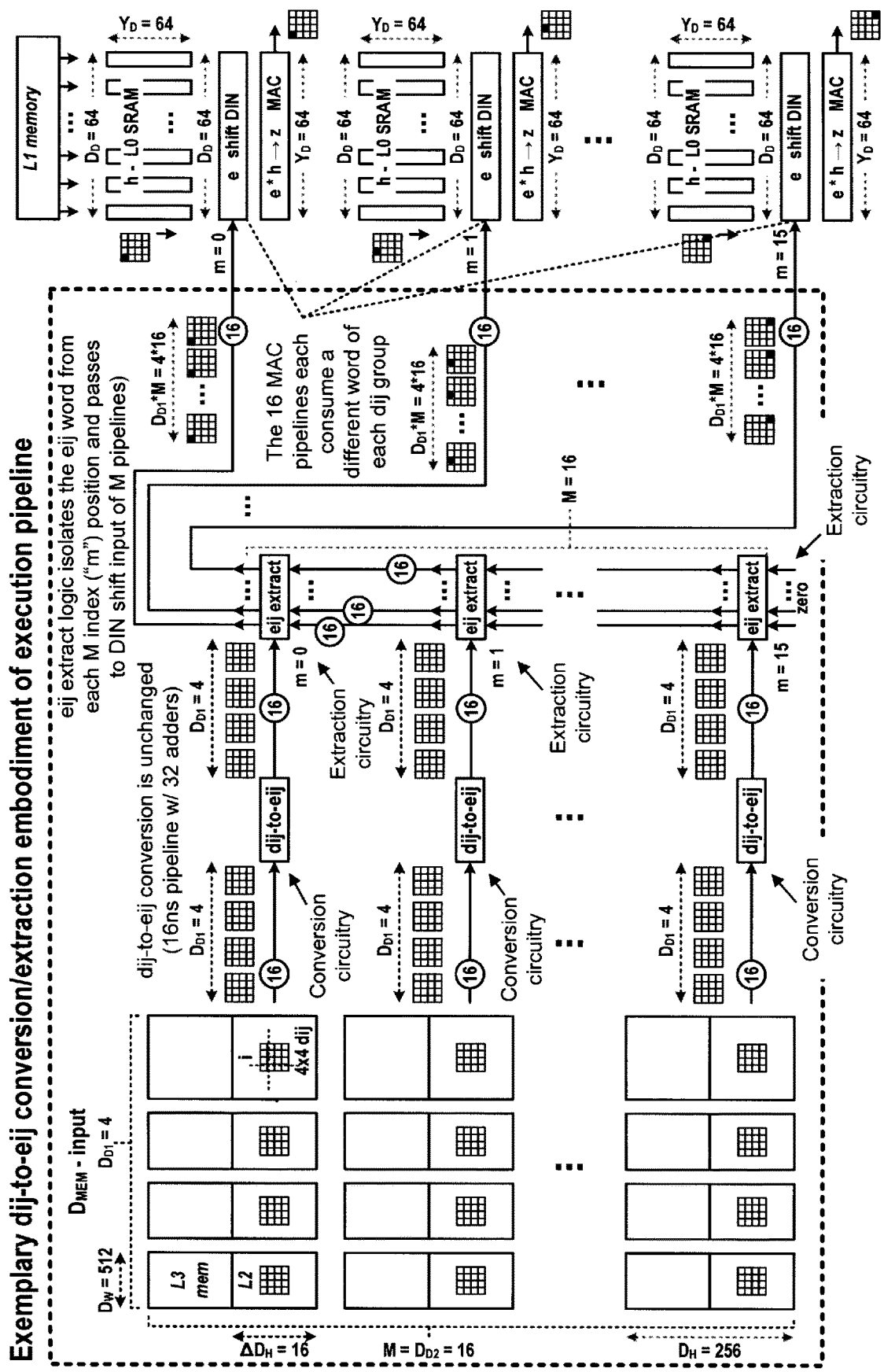
Figure 3C:
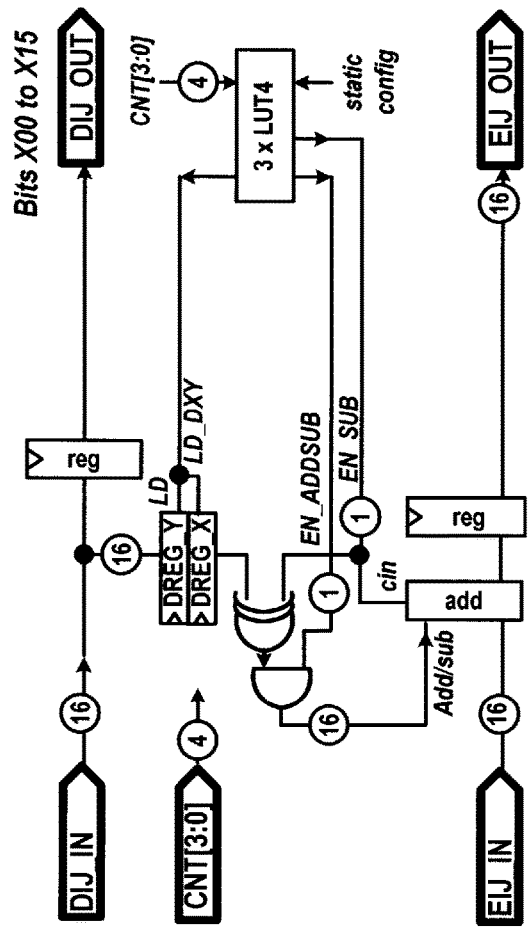
Figure 3D:
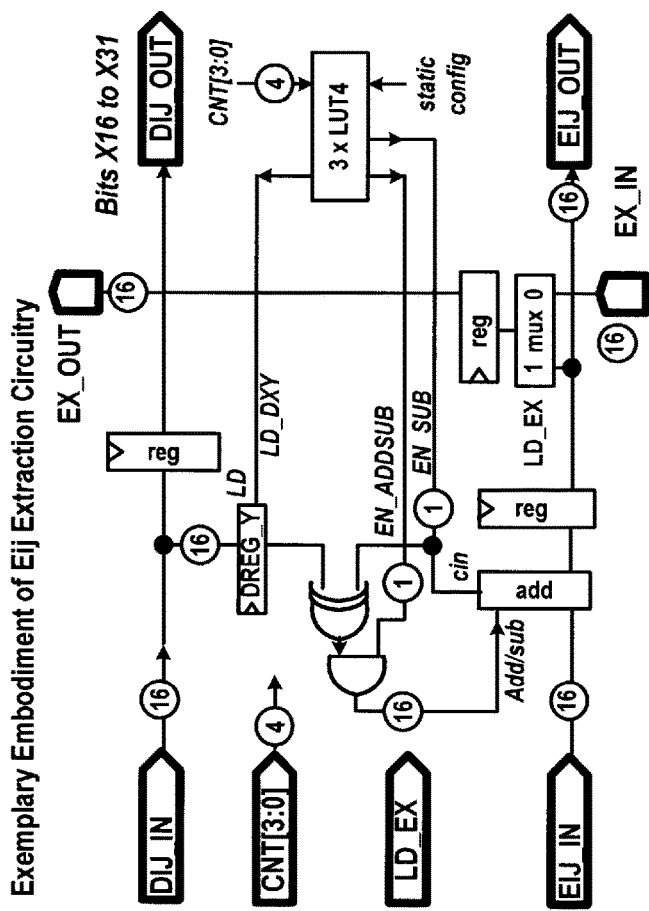
Figure 4A:
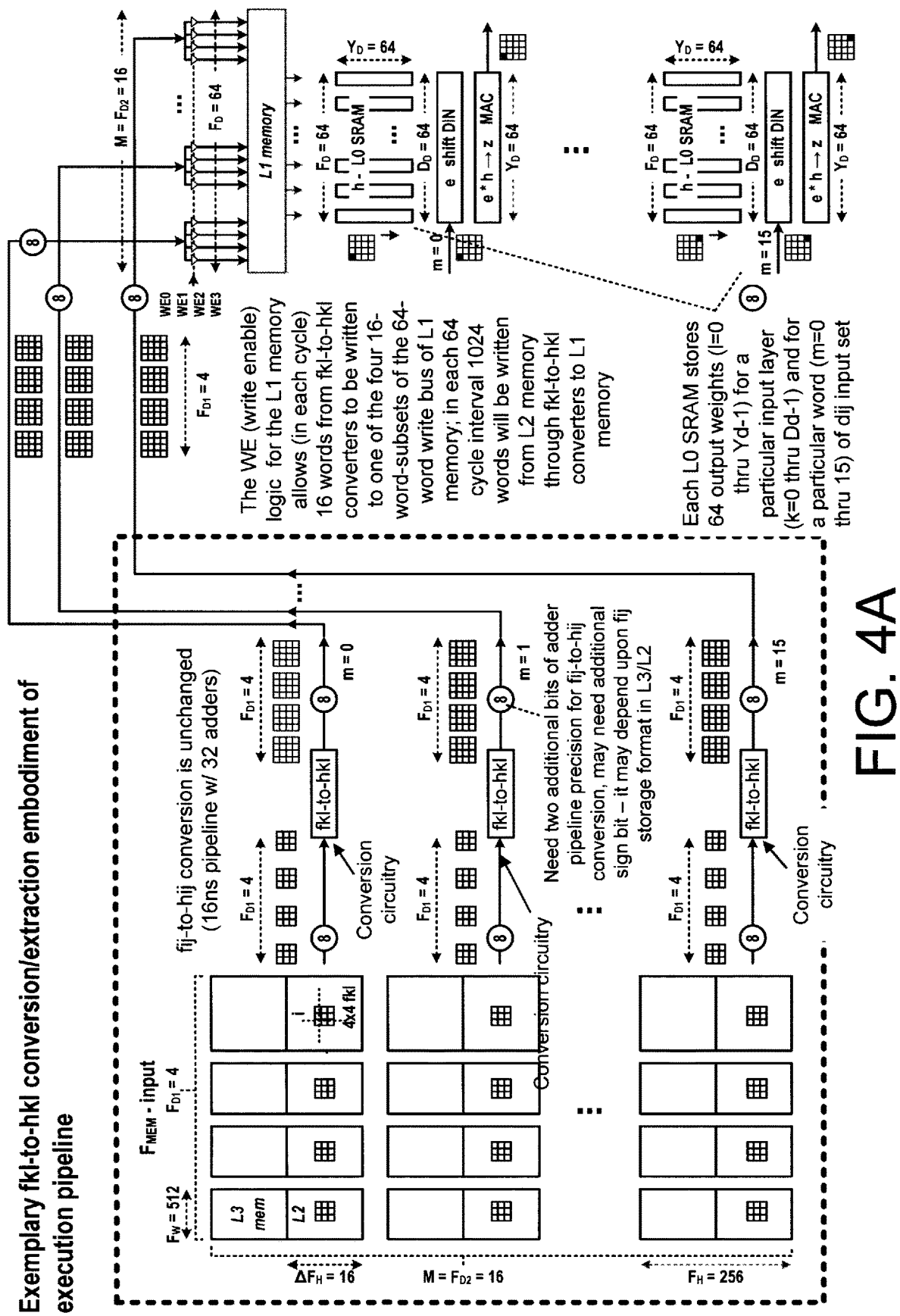
Figure 4C:
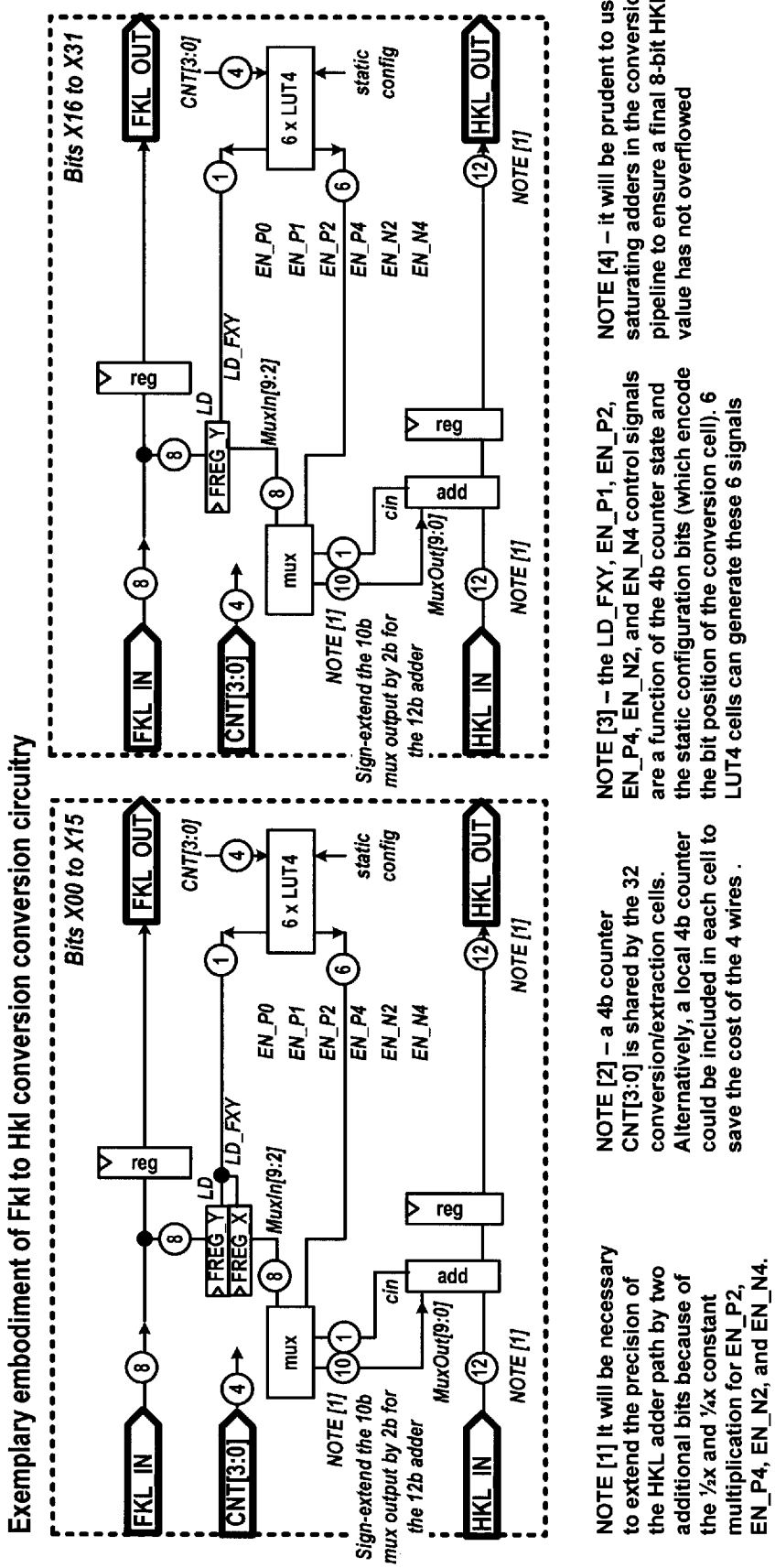
Figure 4D:
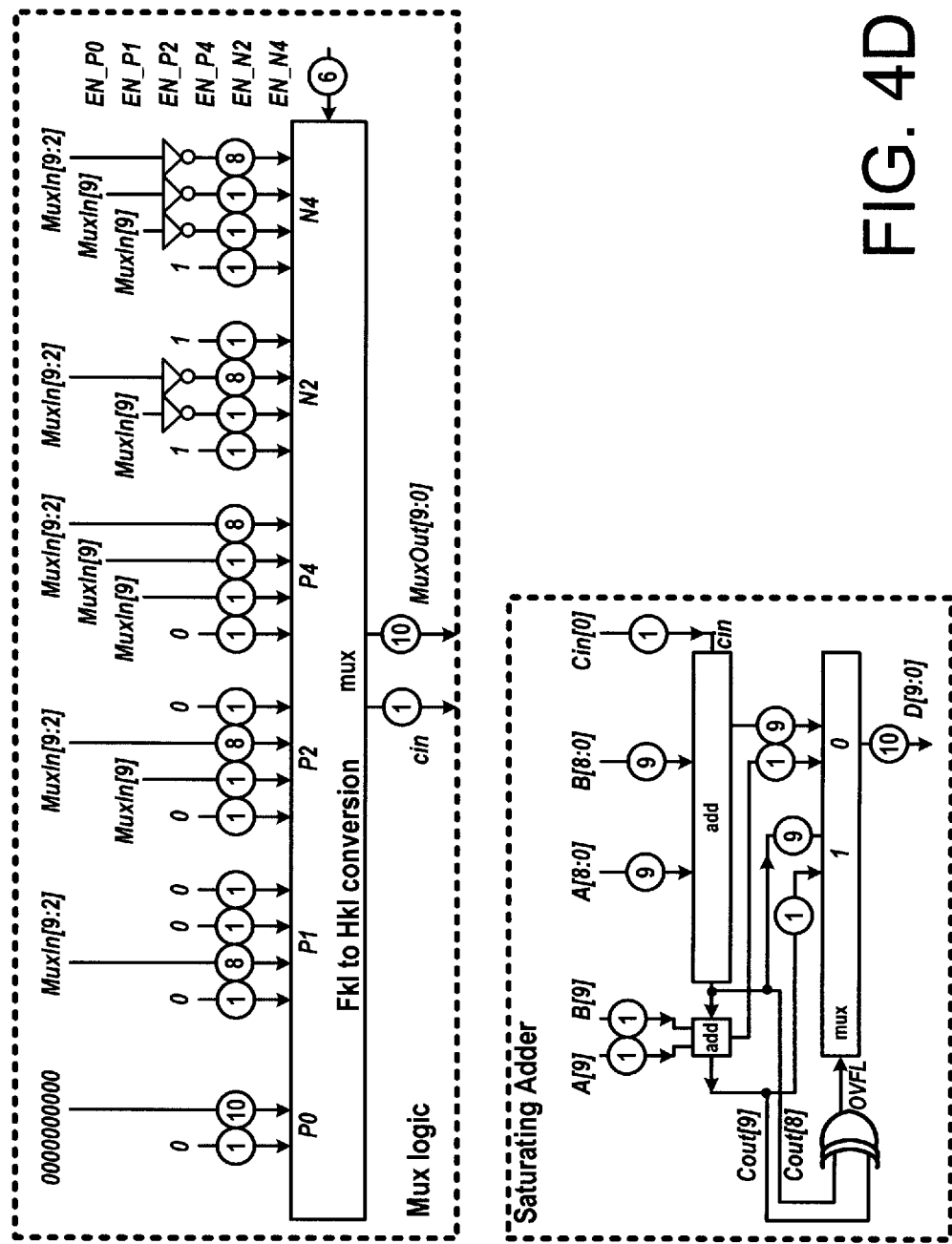
Figure 4E:
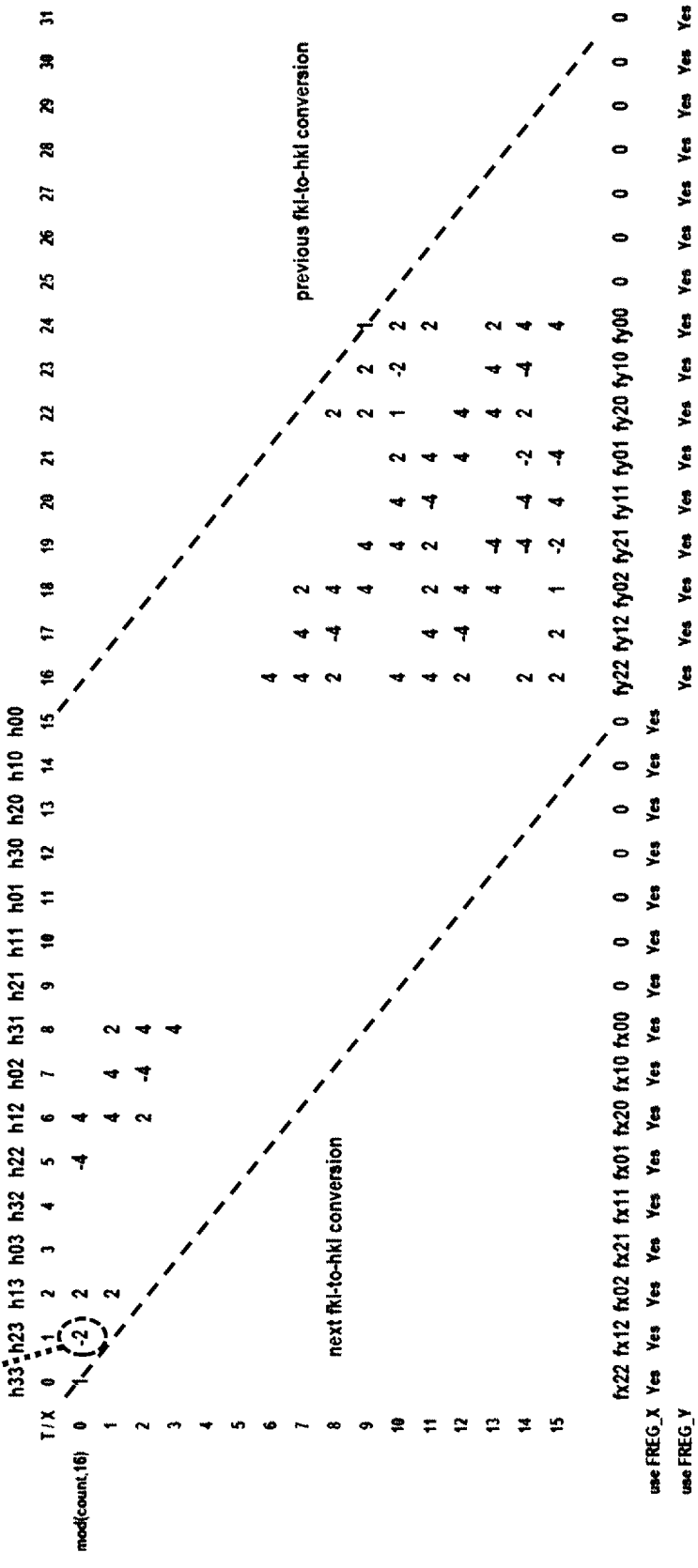
Figure 5A:
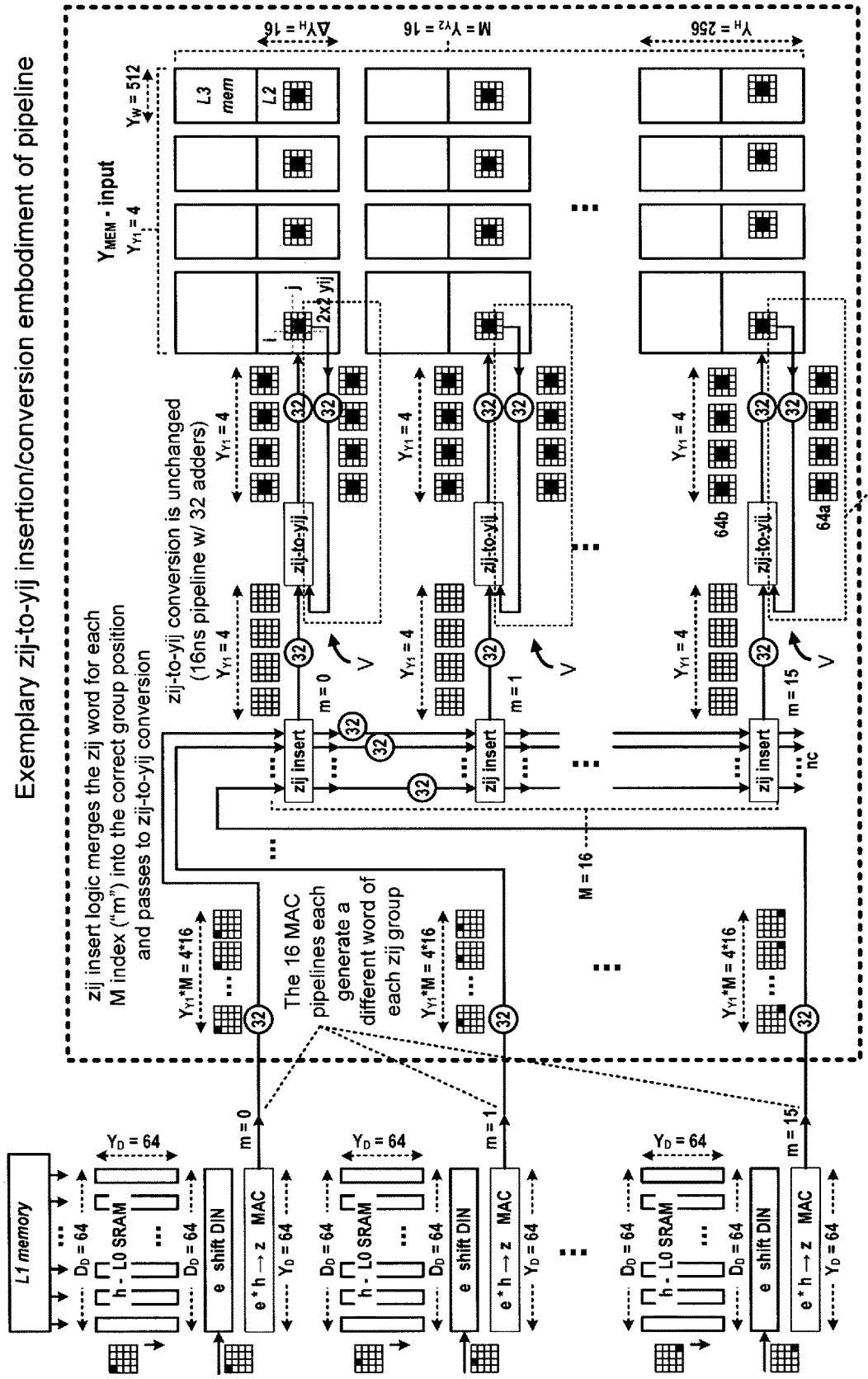
Figure 5C:
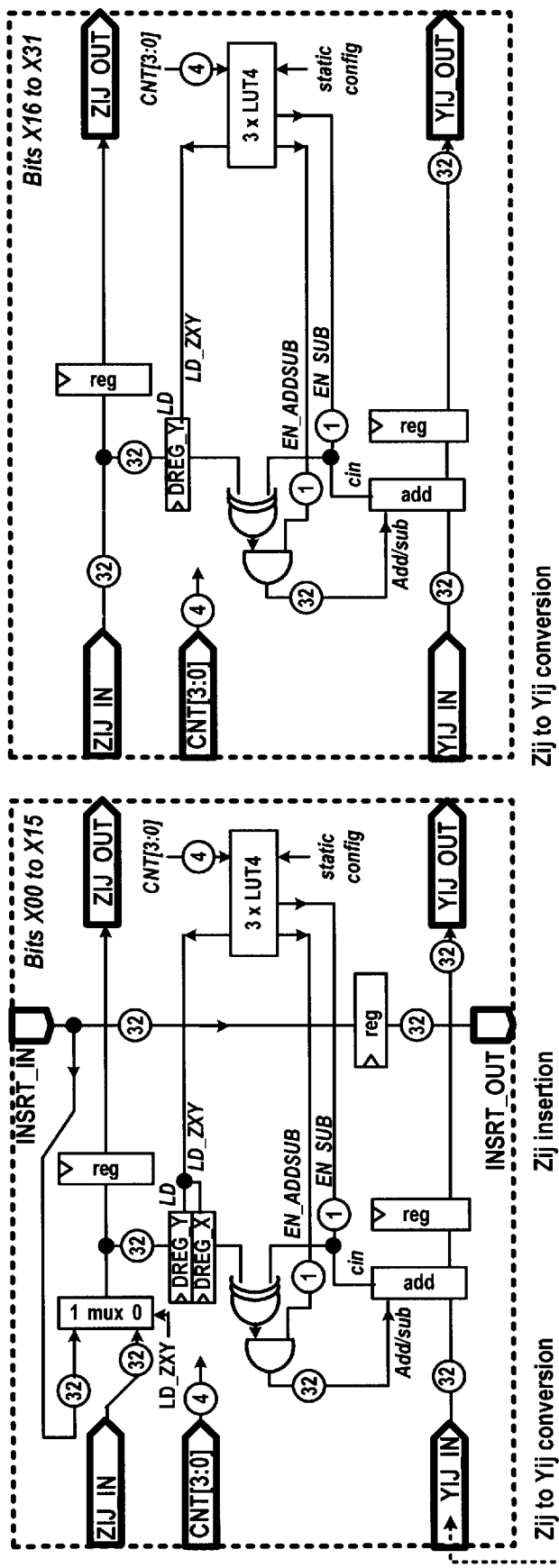
Figure 5E:
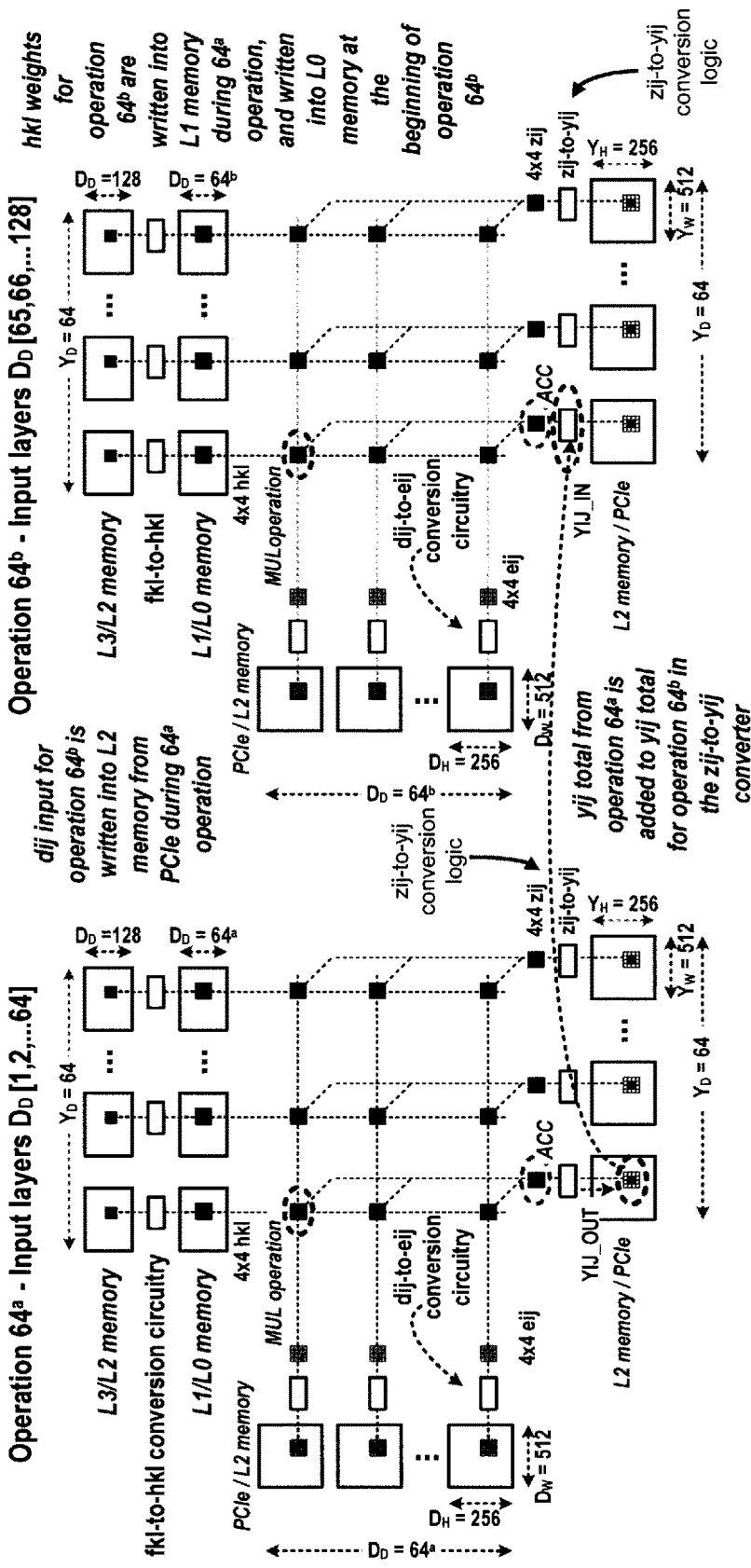
Figure 6A:
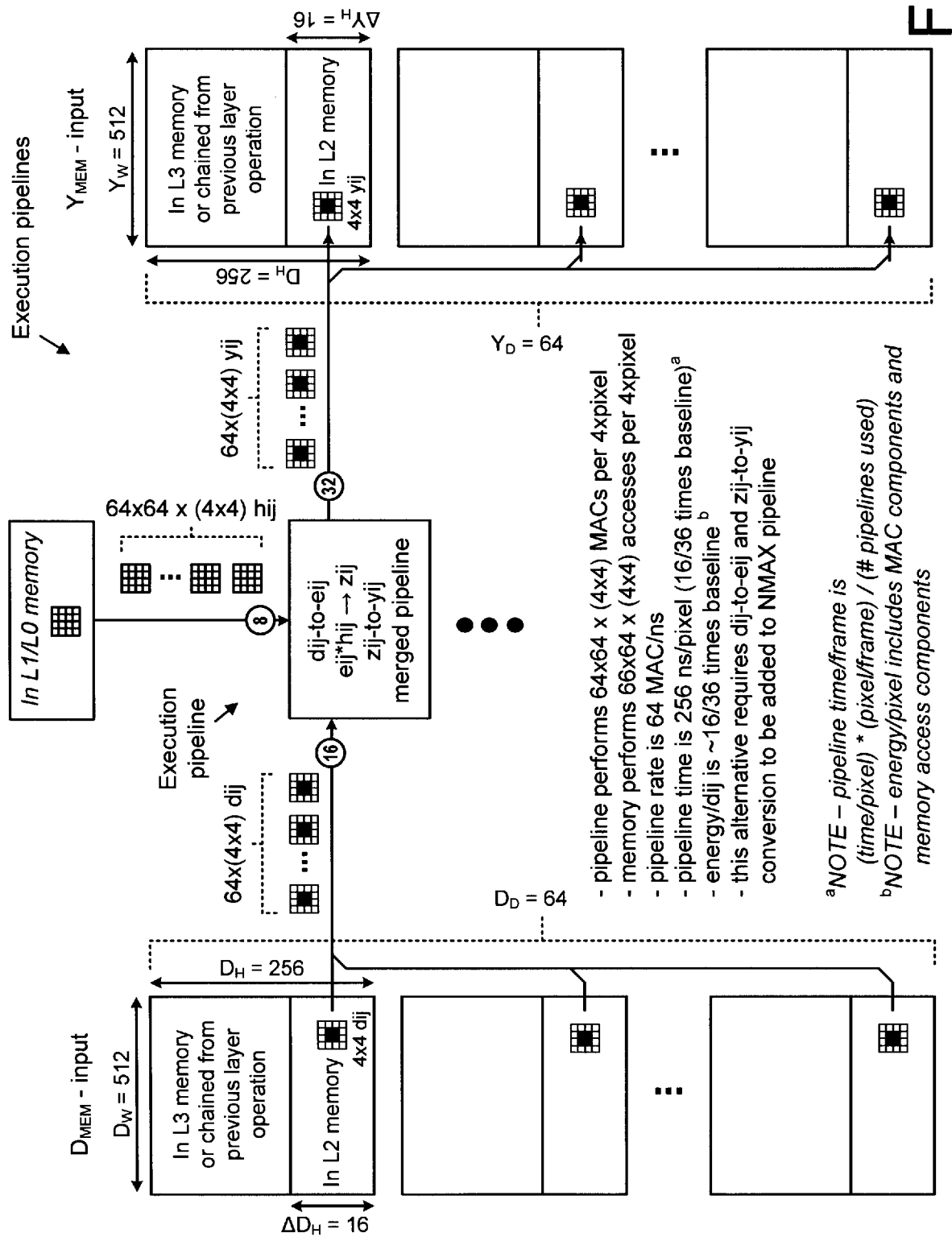
Figure 6B:
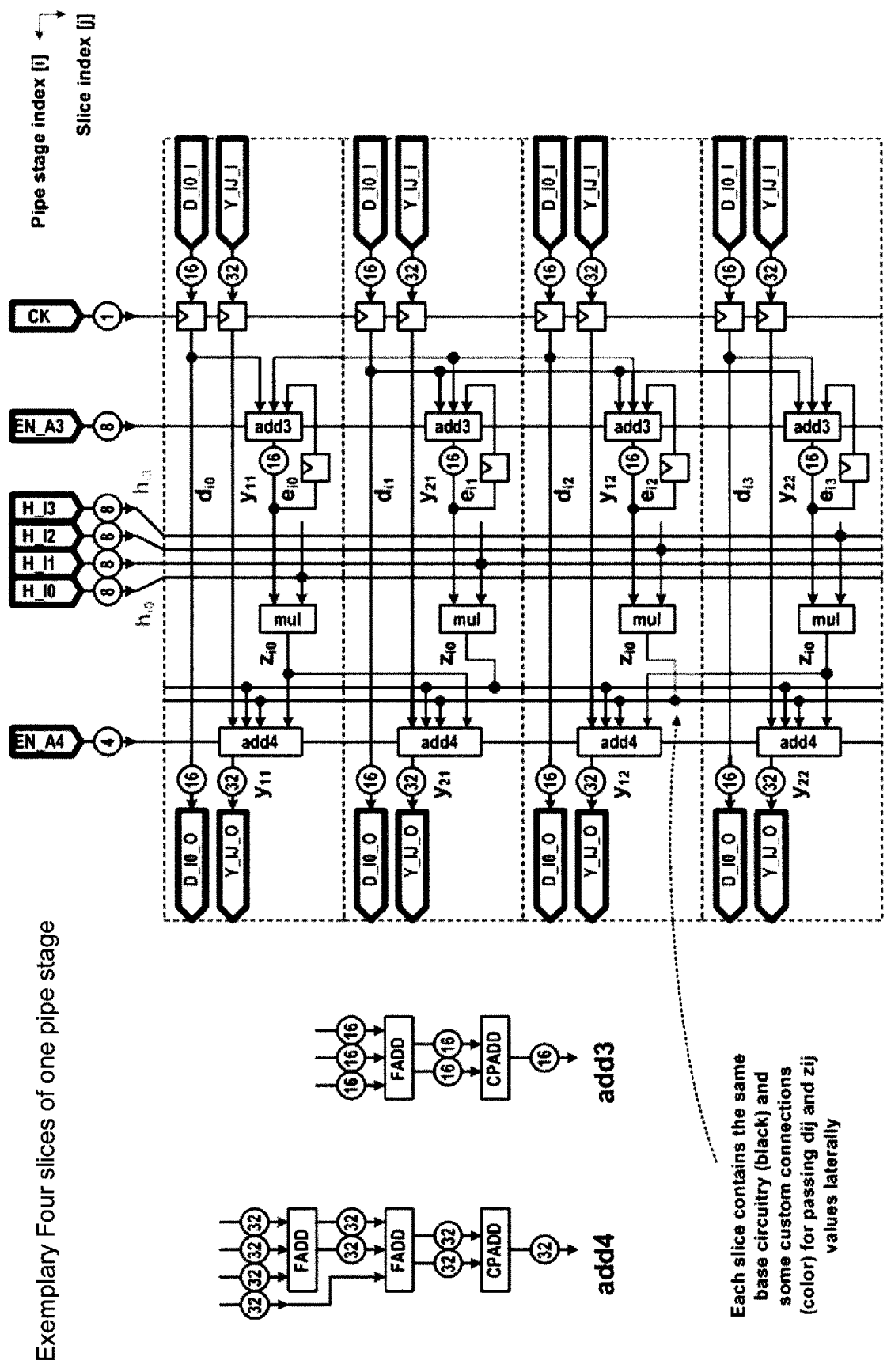
Figure 6C:
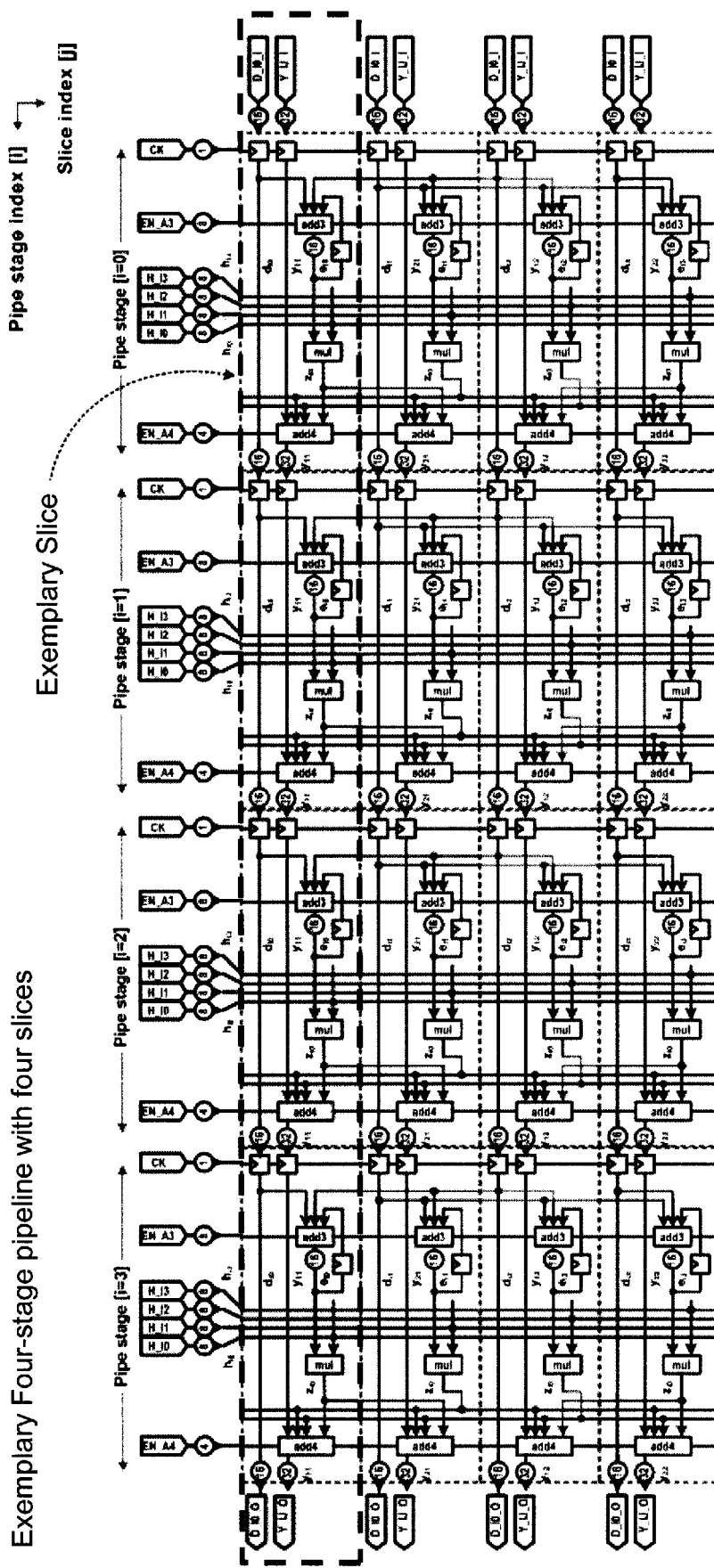
Figure 8:
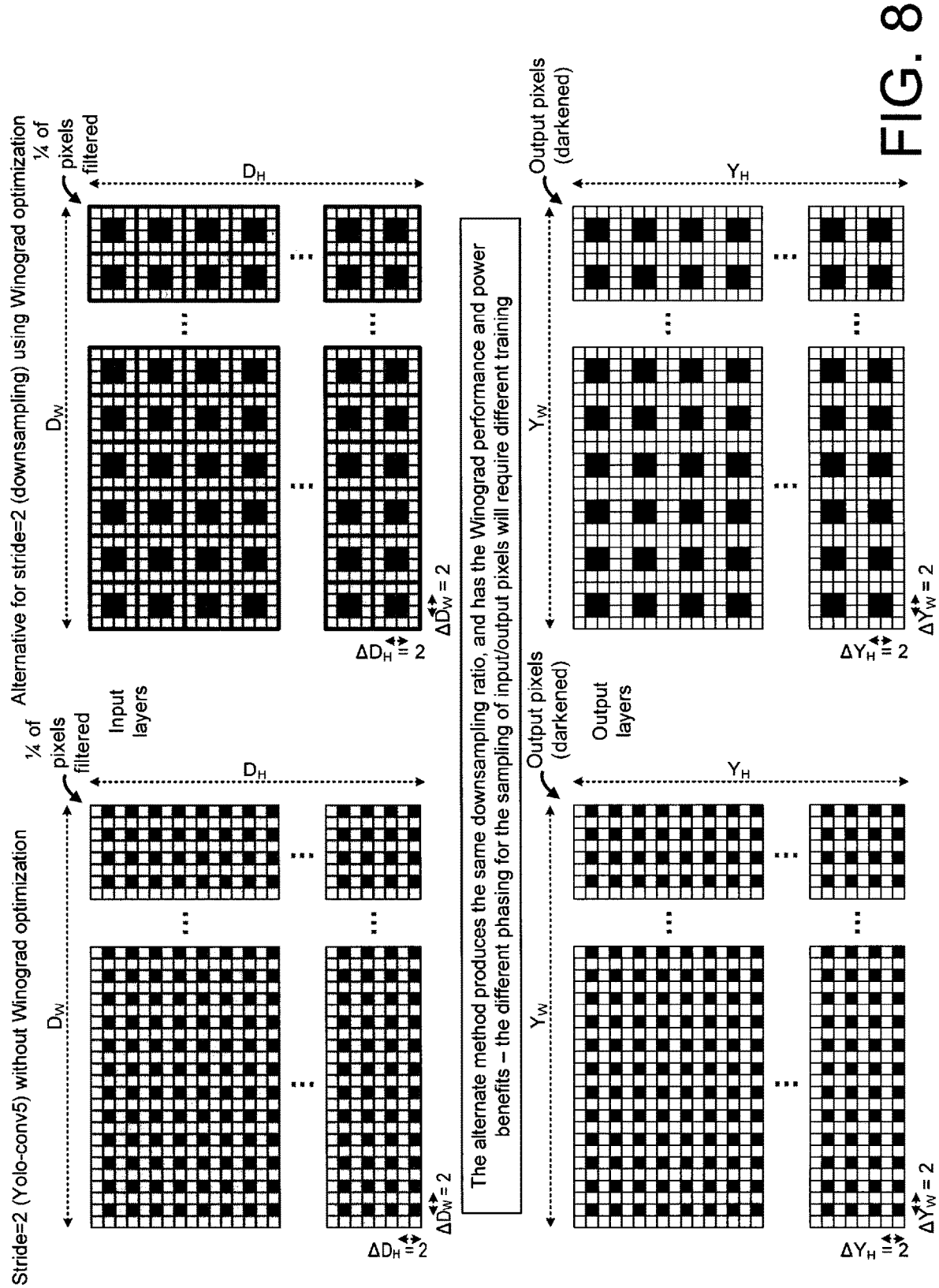
Figure 9:
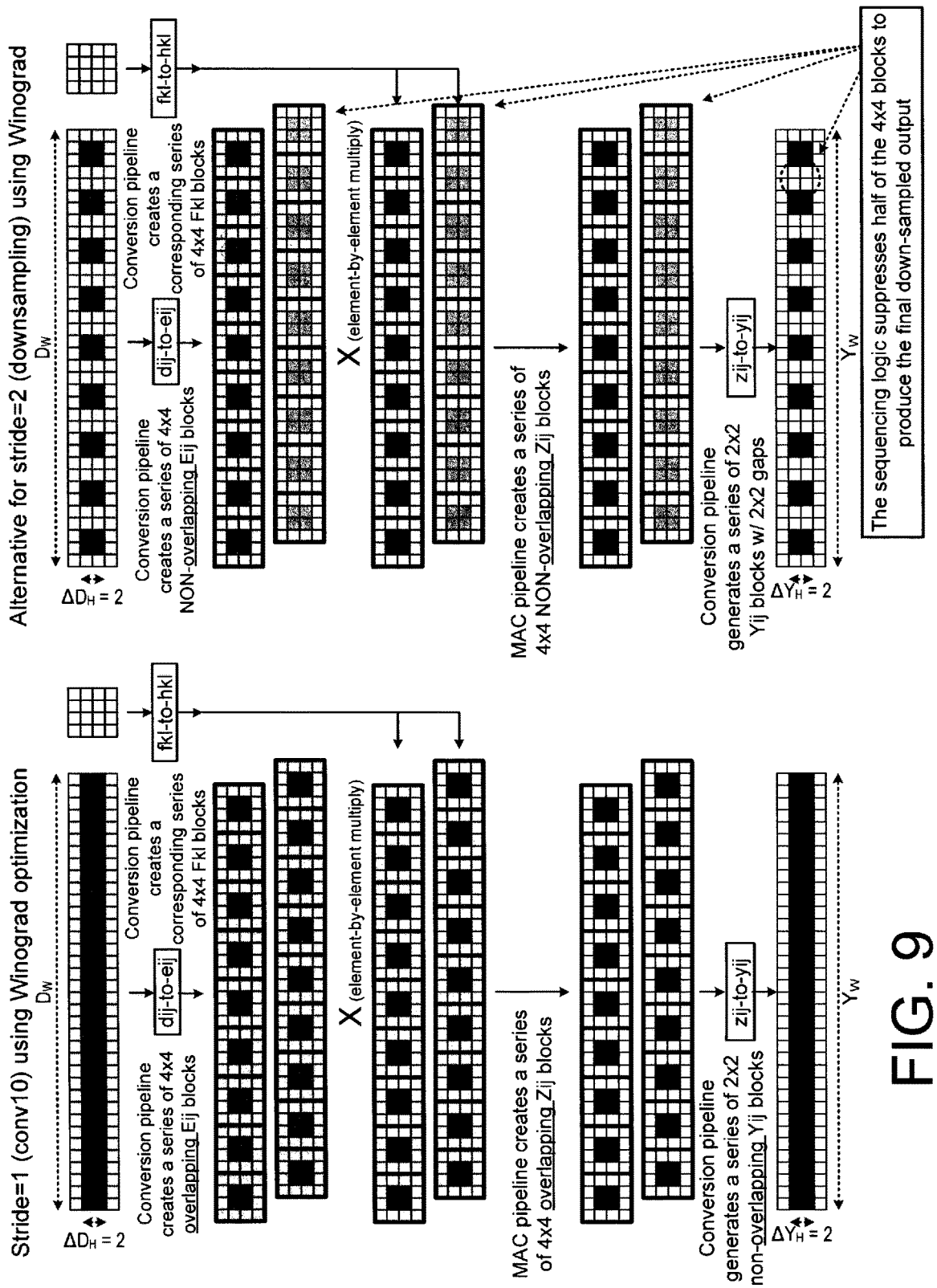
Figure 10A:
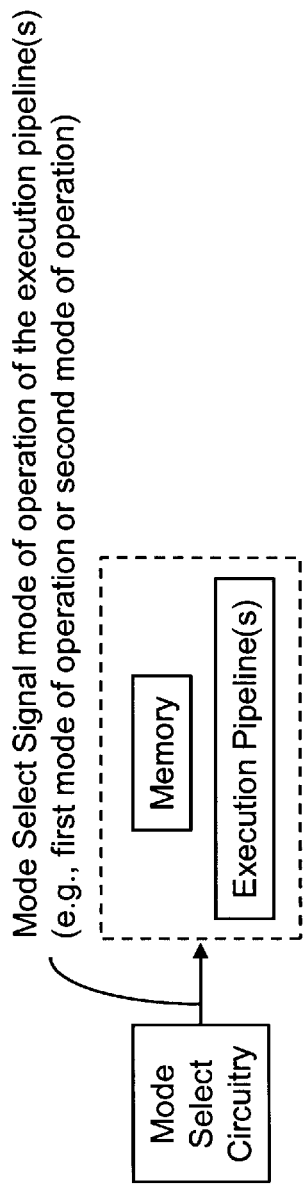
Figure 10B:
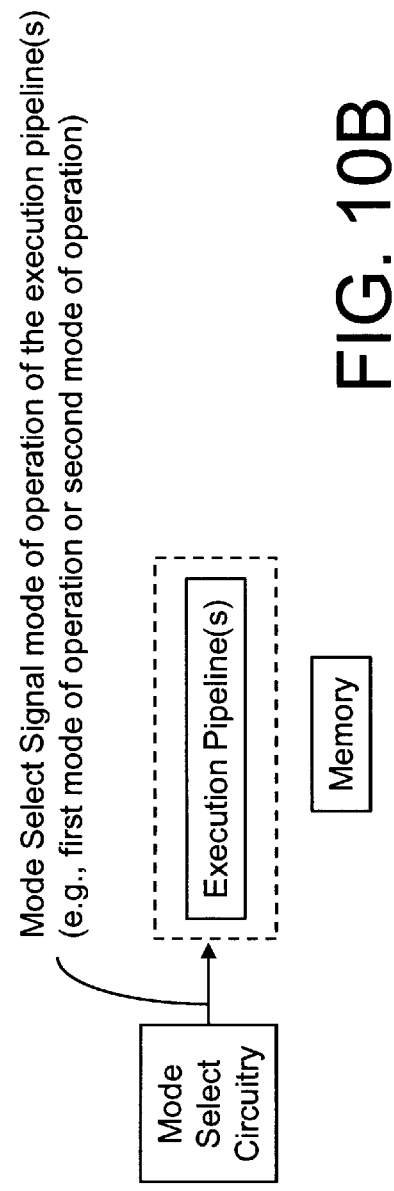

FIG. 1A is a schematic block diagram of a logical overview of a first mode of operation of the multiplier-accumulator execution pipelines wherein each multiplier-accumulator execution pipeline includes multiplier-accumulator circuitry, which are illustrated in block diagram form; notably, the multiplier-accumulator circuitry includes one or more of the multiplier-accumulator circuits (although the individual multiplier-accumulator circuits are not specifically illustrated here);

FIG. 1B is a schematic block diagram of a physical overview of an exemplary embodiment of a multiplier-accumulator execution pipeline, according to certain aspects of the present inventions; notably, each multiplier-accumulator execution pipeline includes associated/separate multiplier-accumulator circuitry; moreover, in one exemplary implementation of this embodiment, the 64×(3×3) input pixels at dij, which determine the 64×(1×1) output pixels at yij, are all processed by a single execution pipeline; here, the 3×3 set/array of input pixels/data is the image data that are correlated with the output data; indeed, each of the execution pipelines of the plurality of execution pipelines processes a separate set of all dij input pixels/data (in this exemplary embodiment, 64×(3×3)) which determine the yij output pixel/data (in this exemplary embodiment, 64×(1×1)) that is associated with the set of all dij input pixels/data processed by the associated multiplier-accumulator execution pipeline of the plurality of execution pipelines;

Figure 2F:
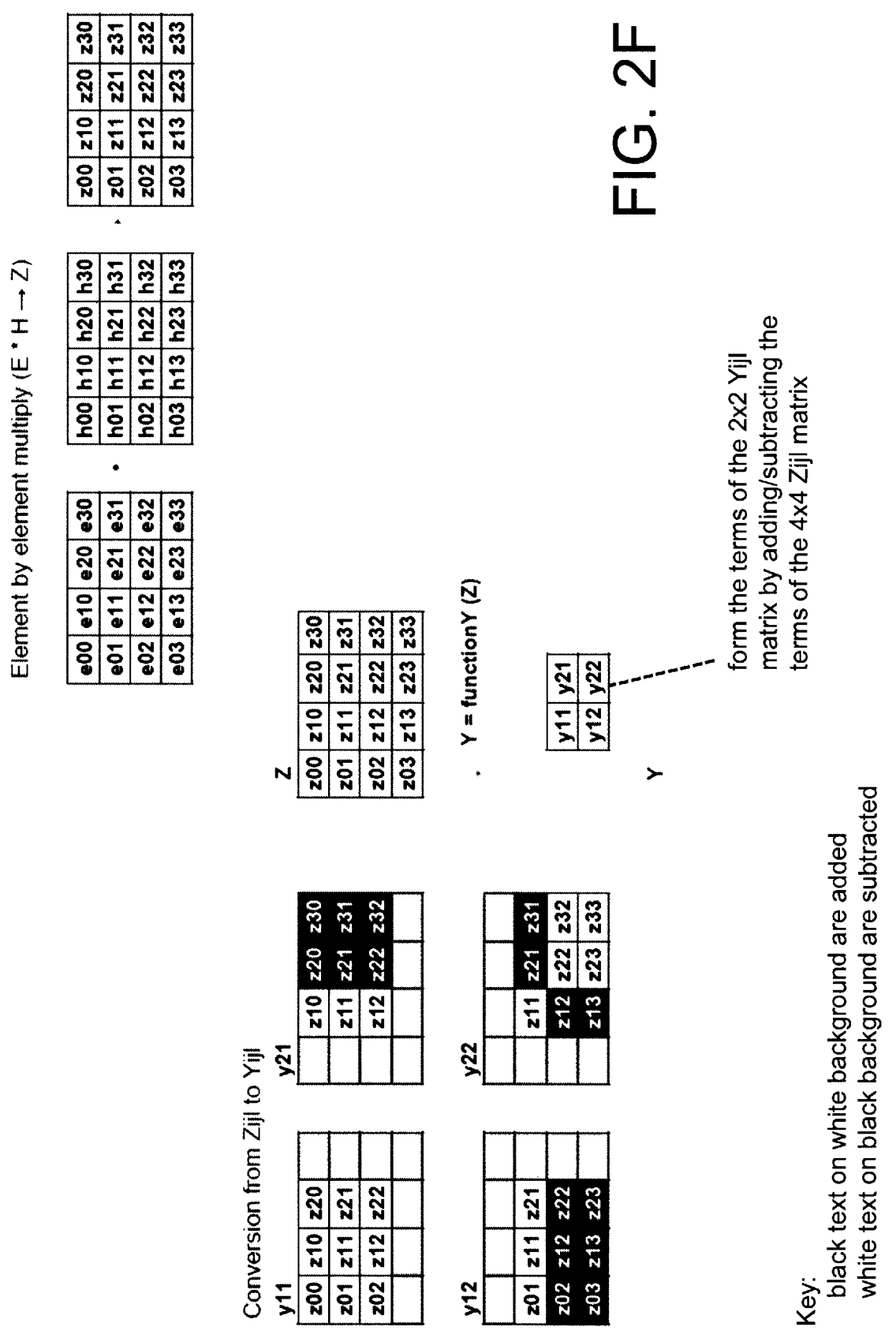

FIG. 2A is a schematic block diagram of a logical overview of an exemplary embodiment of multiplier-accumulator circuitry of the plurality of multiplier-accumulator execution pipelines, implementing a Winograd data processing technique, according to certain aspects of the present inventions; as indicated above, the multiplier-accumulator circuitry includes one or more of the multiplier-accumulator circuits (although the individual multiplier-accumulator circuits are not specifically illustrated here);

FIG. 2B is a schematic block diagram of a physical overview of an exemplary embodiment of a plurality of multiplier-accumulator execution pipelines, each pipeline including the multiplier-accumulator circuitry (illustrated in block diagram form), wherein the plurality of multiplier-accumulator execution pipelines are configured to implement a Winograd technique of data processing, according to certain aspects of the present inventions; notably, in this example, the 64×(4×4) input pixels/data at dij, which determine the associated 64×(2×2) output pixels at yij, are processed by a plurality (here, 16) of multiplier-accumulator execution pipelines (compare the mode of operation described and illustrated in FIG. 1B wherein one multiplier-accumulator execution pipeline processes the 64×(3×3) input pixels at dij, which determine the 64×(1×1) output pixels at yij);

FIG. 2C is an exemplary timing diagram for the physical overview of the exemplary embodiment illustrated in FIG. 2B, according to certain aspects of the present inventions;

FIG. 2D-2F illustrate conversion tables of certain operations implementing the Winograd technique of data processing, including conversion of the filter weights or coefficients, via the f-to-h conversion circuitry, to facilitate Winograd processing (F-to-H processing; FIG. 2D), conversion of the data (e.g., image data), via the d-to-e conversion circuitry, to the Winograd format (D-to-E processing; FIG. 2E), and conversion of the processed image data, z-to-y conversion circuitry, to non-Winograd format, for example, a floating point format (Z-to-Y processing; FIG. 2F) which may facilitate additional processing of the data (e.g., image data), according to certain aspects of the present inventions;

Figure 3E:
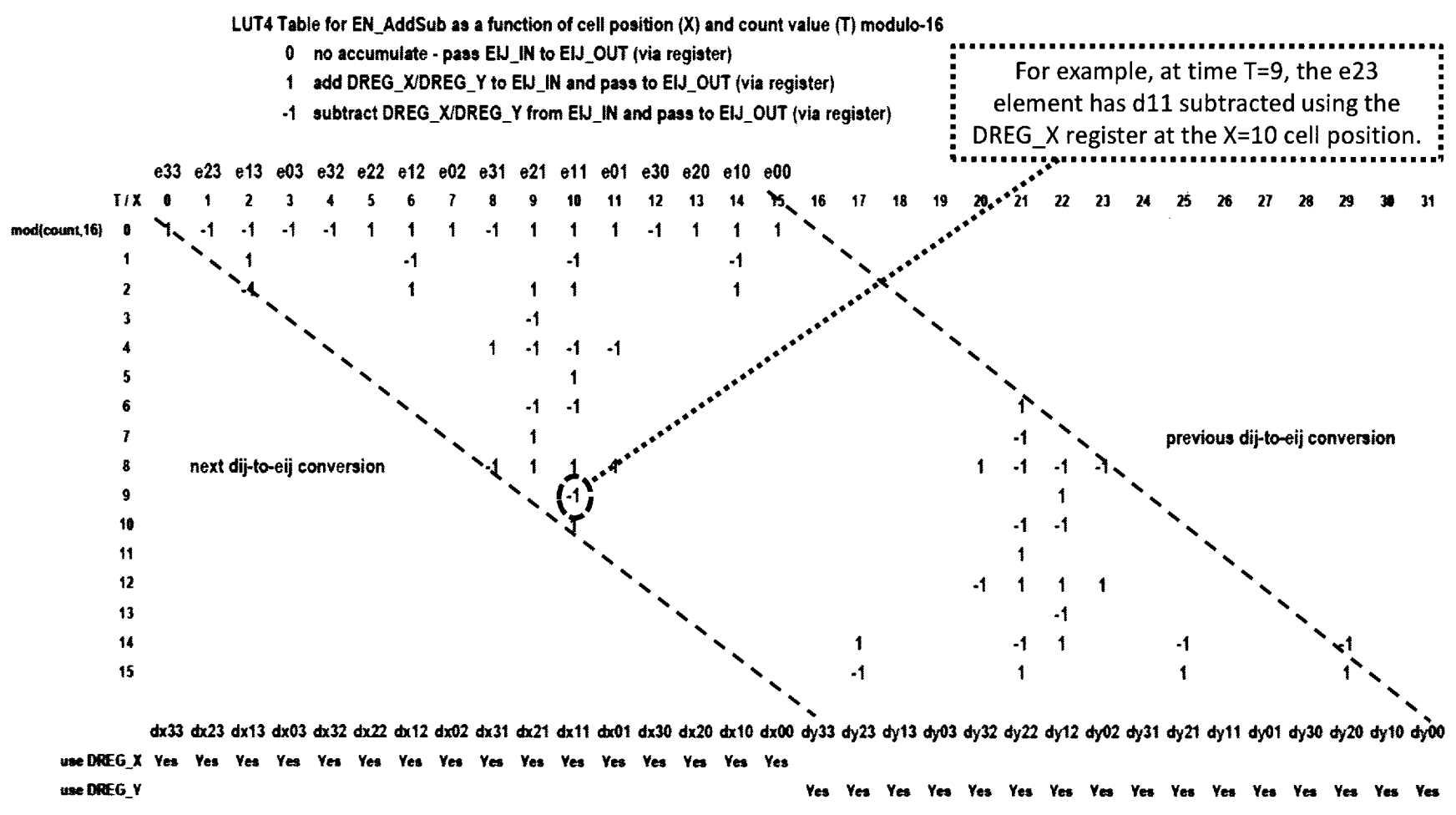

FIG. 3A is a schematic block diagram of a physical details of an exemplary dij-to-eij conversion and extraction circuitry/operation embodiment of the multiplier-accumulator execution pipelines, implementing a Winograd technique of processing (as illustrated in the logical and physical overviews in FIGS. 2A and 2B, respectively), according to certain aspects of the present inventions;

FIG. 3B is an exemplary pseudo-code of the exemplary dij-to-eij conversion and extraction embodiment illustrated in FIG. 3A, according to certain aspects of the present inventions;

FIG. 3C is a schematic diagram of an exemplary cell of the exemplary dij-to-eij conversion circuitry of the multiplier-accumulator execution pipelines of FIG. 3A, according to certain aspects of the present inventions;

FIG. 3D is a schematic diagram of an exemplary cell of the exemplary dij-to-eij extraction circuitry of the multiplier-accumulator execution pipelines of FIG. 3A, according to certain aspects of the present inventions;

FIG. 3E illustrates a coarse diagram of the conversion/extraction pipeline (horizontal axis) and the timing of the individual cells (vertical axis), according to certain aspects of the present inventions;

FIG. 4A is a schematic block diagram of a physical details of an exemplary fkl-to-hkl conversion and extraction circuitry/operation embodiment of a plurality of multiplier-accumulator execution pipelines, implementing a Winograd technique of processing (as illustrated in the logical and physical overviews in FIGS. 2A and 2B, respectively), according to certain aspects of the present inventions;

FIG. 4B is an exemplary pseudo-code of exemplary fij-to-hij conversion and extraction embodiment of the multiplier-accumulator execution pipelines of FIG. 4A, according to certain aspects of the present inventions;

FIG. 4C is a schematic diagram of two exemplary cells of the exemplary fkl-to-hkl conversion circuitry of the execution pipeline of FIG. 4A, according to certain aspects of the present inventions; notably, fkl-to-hkl conversion logic circuitry in this exemplary embodiment includes 16 of the left cell and 16 of the right cell wherein the fkl-to-hkl conversion logic circuitry includes (i) data registers for the fkl and hkl weight values, (ii) control logic for sequencing, and (iii) adder logic for the conversion (according to the conversion tables illustrated in FIG. 2D);

FIG. 4D is a schematic block diagram of an exemplary embodiment of a multiplexer (Mux) circuitry and adder circuitry of the exemplary fkl-to-hkl conversion circuitry of the FIG. 4C, according to certain aspects of the present inventions;

FIG. 4E illustrates a coarse diagram of the conversion/extraction pipeline (horizontal axis) and the timing of the individual cells (vertical axis), according to certain aspects of the present inventions; in this exemplary embodiment, the horizontal axis illustrates the 32 fkl-to-hkl conversion cells in "X" positions {0, 1, . . . 31};

Figure 5D:
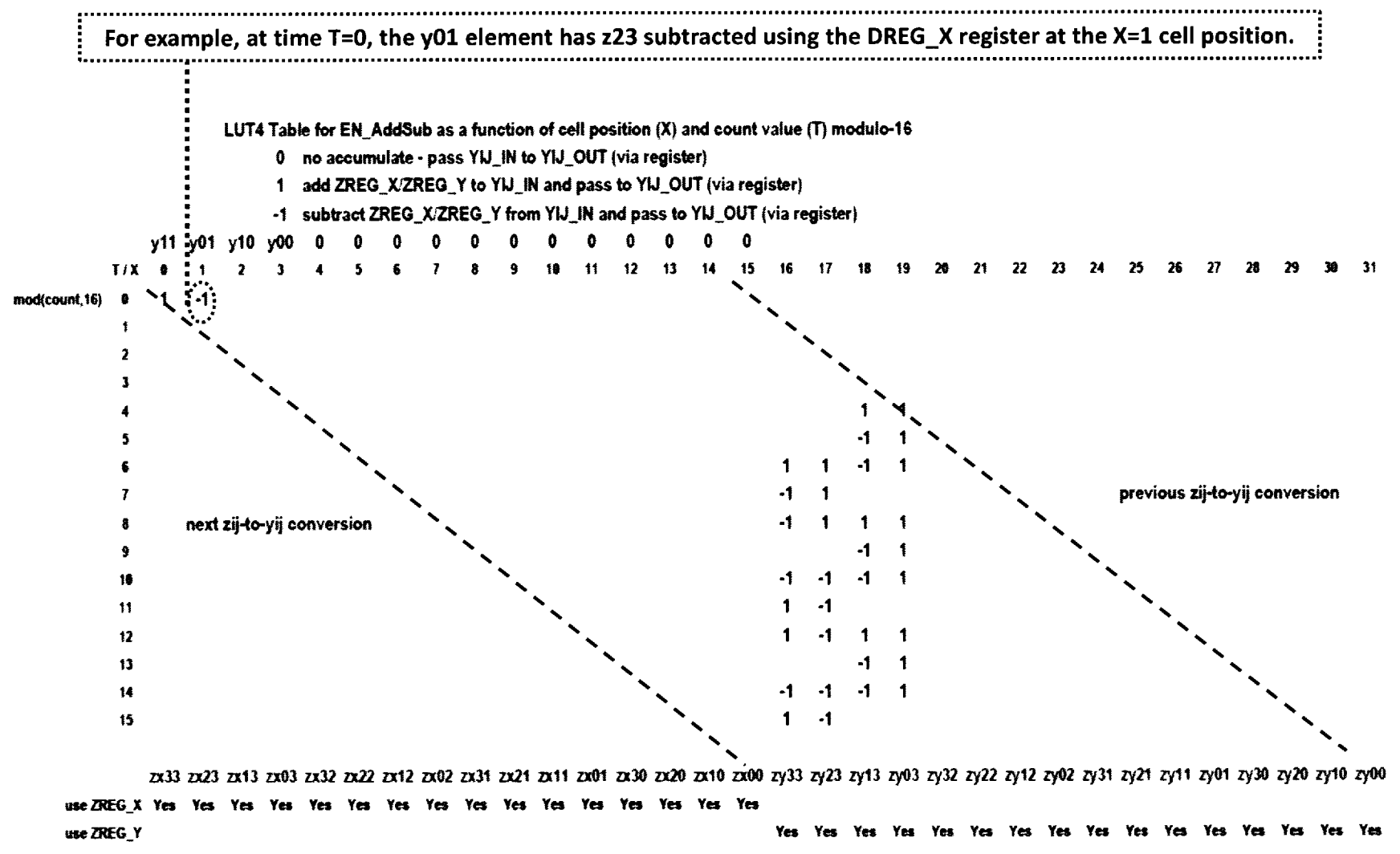

FIG. 5A is a schematic block diagram of a logical overview of an exemplary zij-to-yij insertion and conversion circuitry/operation embodiment of a plurality of multiplier-accumulator execution pipelines, implementing a Winograd technique of processing (as illustrated in the logical and physical overviews in FIGS. 2A and 2B, respectively), according to certain aspects of the present inventions;

FIG. 5B is an exemplary pseudo-code of exemplary zij-to-yij insertion and conversion embodiment of the execution pipeline of FIG. 5A, according to certain aspects of the present inventions;

FIG. 5C is a schematic diagram of an exemplary embodiment of the Zij insertion circuitry and the zij-to-yij conversion circuitry including one cell of the zij insertion logic circuitry (left portion of the figure) and one cell the zij-to-yij conversion logic circuitry (right portion of the figure) of the exemplary zij-to-yij insertion and conversion circuitry of the FIG. 5A, according to certain aspects of the present inventions;

FIG. 5D illustrate a coarse diagram of the conversion/extraction pipeline (horizontal axis) and the timing of the individual cells (vertical axis), according to certain aspects of the present inventions; wherein the horizontal axis shows the 16 zij insertion cells in "X" positions {0, 1, . . . 15}, and the 16 zij-to-yij conversion cells in "X" positions {16, 17, . . . 31}, and the lower axis illustrates the zij elements/values of the 4×4 Z block in their fixed position in the pipeline in registers ZREG_X and ZREG_Y;

FIG. 5E is a schematic block diagram of a logical overview of another exemplary embodiment of multiplier-accumulator circuitry, in block diagram form, of the multiplier-accumulator execution pipelines, implementing a Winograd technique of data processing, according to certain aspects of the present inventions, wherein the accumulation of the first 64 input planes (also called layers here) in the left side, the accumulation values are stored in the Y region of the L2 memory, and a second set of 64 input planes is accumulated in the right side of the figure; notably, in this exemplary embodiment, the 4×4 Z block values applied to (and converted by) the zij-to-yij conversion logic circuitry before being written to the Y region of L2 memory, wherein as the values are applied to and converted by the conversion logic, the Y accumulation values from the first 64 input planes are read from L2 and loading into the accumulation input port of the zij-to-yij conversion logic;

FIG. 6A is a schematic block diagram of a physical overview of another exemplary embodiment of multiplier-accumulator circuitry of the execution pipeline, implementing a Winograd data processing technique, according to certain aspects of the present inventions, wherein the architecture incorporates the D-to-E conversion circuitry and Z-to-Y conversion circuitry, and performs the operations thereof, in the multiplier-accumulator execution pipeline; in addition, the pre-processed and pre-transformed input weights are read from memory by the multiplier-accumulator circuitry in the N×N block form;

FIG. 6B is a schematic diagram of four slices of a multiplier-accumulator execution pipe (one pipeline of the plurality of pipelines) of the exemplary embodiment of multiplier-accumulator circuitry of the execution pipelines, implementing a Winograd data processing technique, according to certain aspects of the present inventions; here, details of four slices of a pipeline stage wherein each of the four slices is processing one of the input streams of the 4×4 input data blocks D (received from the right side in the figure);

FIG. 6C is a schematic diagram of a four-stage pipeline with four slices (as illustrated in FIG. 6B) of the exemplary embodiment of multiplier-accumulator circuitry of the execution pipelines, implementing a Winograd data processing technique, according to certain aspects of the present inventions;

FIGS. 7A-7C illustrate conversion tables of certain operations implementing the Winograd technique of data processing, including conversion of the filter weights or coefficients, via the f-to-h conversion circuitry, to facilitate Winograd processing (F-to-H processing; FIG. 7A), conversion of the data (e.g., image data), via the d-to-e conversion circuitry, to the Winograd format (D-to-E processing; FIG. 7B), and conversion of the processed image data, z-to-y conversion circuitry, to non-Winograd format, for example, a floating point format (Z-to-Y processing; FIG. 7C) which may facilitate additional processing of the data (e.g., image data), according to certain aspects of the present inventions;

FIGS. 8 and 9 illustrate exemplary down-sampling modes of operation, according to certain aspects of the present inventions, using any of the exemplary embodiments of multiplier-accumulator circuitry of the execution pipelines, implementing a Winograd data processing technique, according to aspects of the present inventions; and FIGS. 10A and 10B illustrate, in schematic block diagram form, mode select circuitry to control (i.e., enable and/or disable) or determine the operability of certain circuitry (e.g., conversion circuitry), data paths and/or techniques of processing (e.g., a first mode of operation and/or a second mode of operation—see FIGS. 1A/1B and FIGS. 2A/2B, respectively) of the input data (e.g., image data), for example, in connection with inferencing operations, according to certain aspects of the present inventions; in this regard, the mode select circuitry controls or determines the operation of the multiplier-accumulator circuitry of one or more, or all of the execution pipelines, conversion circuitry, and, in certain embodiments the functionality/operability of the memory (e.g., the reading and/or writing of data in 2D array format—see, e.g., FIG. 10A).

Notably, the pseudo-code, operations, configurations, block/data width, data path width, bandwidths, data lengths, values, processes and/or algorithms described and/or illustrated in the FIGURES are exemplary. Indeed, the inventions are not limited to any particular pseudo-code, operation, block/data width, data path width, bandwidth, value, process and/or algorithm illustrated and/or implemented in accordance with, for example, the exemplary logical or physical overview configurations and/or exemplary conversion logic circuitry.

Again, there are many inventions described and illustrated herein. The present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed or illustrated separately herein.

DETAILED DESCRIPTION

In a first aspect, the present inventions relate to multiplier-accumulator circuitry, and techniques for operating such circuitry, that include circuitry (and performs methods) to implement Winograd type data processes to increase data throughput of the multiplier-accumulator circuitry and processing. In one embodiment, the circuitry and techniques transform input data (e.g., image data), which may be stored in memory (e.g., layers consisting of two-dimensional arrays of image pixels), from an M×M matrix to an N×N matrix (where N and M are positive integers, and N is greater than M (e.g., M=3 and N=4)). The circuitry and techniques, in one embodiment, also transform the input filter weights, values or coefficients, which may also be stored in memory in M×M blocks (e.g., layers consisting of two-dimensional arrays of input filter weights or values), from an M×M matrix to an N×N matrix or blocks. Here, each M×M matrix or block of filter weights or coefficients is associated with an M×M matrix of the input data. After the aforementioned conversions, the multiplier-accumulator circuitry processes the N×N input data using the associated N×N filter weights or coefficients.

In one embodiment, the multiplier-accumulator circuitry processes the N×N input data using the associated N×N weights or coefficients to generate or accumulate output data of a Q×Q matrix. After further processing (e.g., addition and/or subtraction operations), the multiplier-accumulator circuitry generates an output value. That is, the aggregation of the N×N element values by the multiplier-accumulator circuitry (which, in one embodiment, includes N×N execution pipelines) provides or generates the output data/pixels in a Q×Q matrix. In this embodiment, circuitry external to the N×N execution pipelines generates the final Q×Q output after further transformation/conversion (via Z-to-Y conversion logic circuitry) to convert the output data from a Winograd format to a non-Winograd format (e.g., a floating point format) which facilitates or allows values to be accumulated to, for example, an output value which correlates to the processing of the multiplier-accumulator circuitry of an M×M input data. Here, while N×N product elements/values are accumulated with other N×N product elements/values from other input layers, the individual elements/values are accumulated together into the final Q×Q output pixels after the Z-to-Y conversion operation has been performed. The Z-to-Y conversion circuitry, which in this embodiment is external to the execution pipeline, receives the data, transforms that data to generate and output an output value(s) (a P×P matrix, e.g., 1×1 value) which correlates to the multiplication and accumulation processing results of the multiplier-accumulator circuitry of the M×M input data.

In another embodiment, the Z-to-Y conversion logic circuitry, and operation implemented thereby, is incorporated in the execution pipeline. In this embodiment, multiplier-accumulator circuitry may accumulate the individual elements/values of the N×N execute pipeline, within the execution pipeline, so that the processing may be implemented via a single execution pipeline of multiplier-accumulator execution pipelines rather than a plurality of execution pipelines (for example, N×N execution pipelines (e.g., 16 execution pipelines)).

As mentioned above, in one embodiment, the present inventions may include a plurality of separate multiplier-accumulator circuits and a plurality of registers (including a plurality of shadow registers) that facilitate pipelining of the multiply and accumulate operations. (See, e.g., the '306 and '345 applications identified above). The present inventions may be implemented in conjunction with the inventions and/or embodiments of the '306 and '345 applications, which facilitate concatenating the multiply and accumulate operations, and reconfiguring such operations, thereby allowing a plurality of multiplier-accumulator circuitry to perform such operations more rapidly.

In one embodiment, the circuitry and techniques of the present inventions reads the M×M blocks of filter weights or coefficients from memory and thereafter transforms or converts such M×M blocks of filter weights/coefficients to N×N blocks, wherein each N×N block filter weights/coefficients is associated with at least one N×N block of input data. In this embodiment, the input data and the weights are read from memory by the multiplier-accumulator circuitry, then converted or transformed during operation of the multiplier-accumulator circuitry/pipeline (i.e., during operation of the circuitry of the execution pipeline (in situ) or on the fly) to a Winograd format. In this way, the filter weights or coefficients are first converted to a Winograd format and thereafter provided to the multiplier-accumulator circuitry for processing.

In another embodiment, the filter weights or coefficients are transformed or converted to a Winograd format beforehand and stored in memory as N×N blocks. In this way, the filter weights or coefficients are immediately suitable for processing using the Winograd techniques. Thus, in this alternative embodiment, the transformed input weights are stored in memory in the N×N block form and then read from memory by the multiplier-accumulator circuitry in the N×N block form. The multiplier-accumulator circuitry employs the pre-transformed weights with the associated input data (that is transformed, during operation or on the fly, by the circuitry and techniques of the present inventions from M×M blocks of input data to N×N blocks of input data) during operation and performance of the multiplier-accumulator circuitry/pipelines.

Notably, the transformation of the filter weight or coefficient may be performed by an off-chip computing system and then stored in memory. During operation, the multiplier-accumulator circuitry/pipelines (i.e., on the fly) accumulates N×N product data/elements using the N×N blocks of weights and associated N×N blocks of input data that are transformed by the circuitry and techniques of the present inventions.

With reference to the logic and physical overviews illustrated in FIGS. 1A and 1B, respectively, in one embodiment, input data (e.g., image data/pixel) is stored in memory (e.g., organized in planes or layers) consisting of two-dimensional arrays of input or image data/pixels (e.g., M×M where M=3). The input or image data/pixels of each two-dimensional array (e.g., 3×3 array or set of data) correlates with/to or contributes to an output data value. In one embodiment, the image data/pixels are organized and/or stored in memory in "depth" planes or layers (e.g., K depth planes where, in one embodiment, K=64; wherein each plane includes a plurality of pixels (e.g., in one embodiment, there are 9 pixels in each plane)) and the output data, after processing, is stored in memory and, in one embodiment, organized in output "depth" planes or layers (e.g., L output depth planes/layers where, in one embodiment, L=64). The memory may also store input weight or coefficients that are associated with the input data. The input weight or coefficients, in one embodiment, are stored in the memory in M×M blocks or arrays, with K×L blocks or arrays covering combinations of input and output layers (e.g., all combinations).

With reference to FIG. 1B, in a first mode of operation of the multiplier-accumulator circuitry, a single multiplier-accumulator execution pipeline of the execution pipelines is employed to accumulate a 1×1 pixel output value in a single output layer by aggregating the sum of K×M×M multiplications of input data values and associated input weight values from K layers of input data. Briefly, in this mode of operation, a 3×3 (M×M) multiply and accumulation is performed by the multiplier-accumulator circuitry of the multiplier-accumulator execution pipeline, resulting in the Vijkl value (see FIG. 1—"ΣM" notation). For example, all of the image data which correlates with/to or contributes to that single output data value are applied to or employed by the multiplier-accumulator execution pipeline which, after processing thereby, generates a Vijkl value. Thereafter, in one embodiment, the execution pipeline further performs the accumulation of the Vijkl value of each of the input planes (see, index K), resulting in the Yijl value (see "ΣK" notation). The result of these accumulation operations, via such processing, is a single pixel value Yijl (1×1) which is written into the output plane (e.g., in parallel or concurrently with other single pixels written into the other output planes with other output depth values (e.g., "L" index values)). The processing, as described above, by the one multiplier-accumulator execution pipeline may continue for each of the pixels of the plane. Moreover, each of the execution pipelines of the plurality of execution pipelines (see, e.g., FIG. 1B which illustrates one execution pipeline of the plurality) processes a separate set of all dij input pixels/data (in this exemplary embodiment, 64×(3×3)) that determine the associated yij output pixels/data (in this exemplary embodiment, 64×(1×1)).

Notably, there are a plurality of planes that comprise one layer (which may include image data and information that is not visual (e.g., identification of an object in the layer)) and a plurality of layers comprise one frame.

With reference to FIGS. 2A, 2B and 2C, in another embodiment, in a second mode of operation of the multiplier-accumulator circuitry, N×N execution pipelines are employed to generate an output layer (which includes a plurality of planes and, in one embodiment, additional information such as identification related information)) wherein the two-dimensional arrays of input or image data/pixels are transformed from M×M arrays (e.g., M=3) to N×N arrays (e.g., N=4). Here, D-to-E conversion circuitry implements logic operation to convert M×M arrays of input data (e.g., image data/pixel) to generate N×N arrays of input or image data/pixels. (See, FIGS. 3A-3D).

Similarly, the two-dimensional arrays of input/filter weights are transformed or converted from M×M arrays (e.g., M=3) to N×N arrays (e.g., N=4). In one embodiment, F-to-H conversion circuitry (e.g., in a pipeline architecture) is employed to convert the M×M arrays of filter weights or coefficients to generate the N×N arrays of filter weights or coefficients that are properly correlated with/to the associated locations of the input values. (See, FIGS. 4A-4D). In one embodiment, the F-to-H conversion logic circuitry is disposed between a memory that initially receives and stores the M×M arrays of filter weights or coefficients and the multiplier-accumulator execution pipelines. In operation, the filter weights or coefficients are read from memory and provided to F-to-H conversion circuitry, which converts the weights or coefficients from M×M arrays (e.g., M=3) to N×N arrays (e.g., N=4). Thereafter, the filter weights or coefficients are provided to the multiplier-accumulator execution pipelines wherein the image data/pixels are processed via the multiplier-accumulator circuitry of the execution pipelines.

In another embodiment, the memory stores the N×N arrays of input weights or weight values which were pre-computed (e.g., off-chip or by circuitry external to the multiplier-accumulator execution pipelines) and stored in memory as N×N arrays of filter weights or coefficients. In this embodiment, the F-to-H conversion logic circuitry is not disposed between memory and the multiplier-accumulator execution pipelines and/or the F-to-H conversion operation are performed prior to storing the filter weights or coefficients in memory. As in the previous embodiment, the filter weights are converted before employing that data in the multiplier-accumulator execution pipelines. Notably, storing the pre-computed N×N arrays of input weights or weight values in memory (rather than computing such values during operation, the multiplier-accumulator circuitry/pipeline (i.e., on the fly)), however, may increase the memory storage necessary for such input weights or weight values which, in turn, may increase the capacity requirements of the memory employed in this alternative embodiment (e.g., an increase may be on the order of N×N/M×M, or about 16/9 in this exemplary embodiment).

With continued reference to FIGS. 2A and 2B, in the second mode of operation of the multiplier-accumulator circuitry, the multiplier-accumulator circuitry of a plurality of execution pipelines perform the accumulation of values Uijklm (from the Eijk*Hklm multiplies) from the input planes (index K), into the Zijlm values, as shown by the ΣK notation—wherein the N×N (e.g., 4×4) multiplication substitutes or replaces the M×M (e.g., 3×3) of the multiplier-accumulator circuitry illustrated in FIGS. 1A and 1B. Each two-dimensional array/set of data includes input or image data/pixels (e.g., all of the input or image data/pixels) that correlates with/to or contributes to an output data value. That is, in the second mode of operation, the multiplier-accumulator circuitry of each execution pipeline of the plurality of pipelines performs a plurality (e.g., 16) multiplications and, in one embodiment, the accumulation operations are implemented or performed in the zij-to-yij conversion block whereby four output pixels at Yijl (2×2) are written to the output plane (in parallel with other Yijl 2×2 pixels written into the other output planes (other L index values)).

Notably, FIGS. 2A and 2B are logical and physical overviews, respectively, of the second mode of operation of the multiplier-accumulator execution pipelines of the multiplier-accumulator circuitry, according to certain aspects of the present inventions. FIG. 2C is an exemplary timing overview of the physical overview illustrated in FIG. 2B, according to certain aspects of the present inventions. Further, FIGS. 3A, 4A and 5A are physical details of the physical overview illustrated in FIG. 2B, according to certain aspects of the present inventions. Moreover, FIGS. 3C, 3D, 4C, 4D, and 5C illustrate gate/RTL details of the conversion logic circuitry of exemplary embodiments of the certain aspects of the present inventions illustrated herein. FIGS. 3E, 4E and 5D illustrate certain sequencing details of the conversion logic circuitry, according to certain aspects of the present inventions.

In particular, FIG. 3A illustrates additional details of the D-to-E conversion logic, according to certain aspects of the present inventions, illustrated in FIGS. 2A and 2B. Here, memory (e.g., L2 SRAM memory) storing, in this exemplary embodiment, 4×4 D blocks, may be segmented or divided into 16 physical blocks, so that 16 sets of data may be accessed in parallel for use by the 16 multiplier-accumulator execution pipelines of the multiplier-accumulator circuitry. Each set of input data (e.g., image data) consists of four 4×4 D blocks which may be read/accessed in 64 words from each physical block of memory (for example, in one embodiment, with each access of L2 SRAM memory (e.g., that may require 1 ns)). Here, the 4×4 D blocks may be converted to 4×4 E blocks by the 16 dij-to-eij conversion circuitry implementing conversion operations. The 4×4 E blocks are separated into 16 streams that are sorted by the individual eij values/elements of the 4×4 E blocks. This operation, in one embodiment, is performed by the eij extract logic circuitry (one eij extraction circuitry for each stream (16 in this exemplary embodiment). Each of the 16 eij streams may be directed to the e-shift-in block of one of the 16 multiplier-accumulator execution pipelines of the multiplier-accumulator circuitry.

Notably, FIGS. 3C and 3D illustrate additional detail of one cell of the dij-to-eij conversion logic circuitry and one cell the eij extraction logic circuitry, respectively, according to certain aspects of the present inventions. The dij-to-eij conversion logic circuitry includes, in one exemplary embodiment, (i) 16 of the left cell, (ii) data registers for the dij and eij data words, (iii) control logic for sequencing the operations of the process, and (iv) adder logic for the conversion (according to the conversion tables in FIG. 2E). The eij extraction logic circuitry further includes, in this exemplary embodiment, (i) 16 of the right cell, (ii) data registers for the dij and eij data words, (iii) control logic for sequencing the operations, and (iv) adder logic for the conversion (according to the conversion tables in FIG. 2E). In addition, dij-to-eij conversion circuitry also includes the vertical "EX_IN" and "EX_OUT" ports which carry the extracted eij values/elements to the associated or appropriate multiplier-accumulator execution pipelines of the multiplier-accumulator circuitry. Note that some of the dij-to-eij conversion process may be implemented or performed in the eij extraction cells.

FIG. 3E illustrates a coarse diagram of the conversion/ extraction pipeline (horizontal axis) and the timing of the individual cells (vertical axis), according to certain aspects of the present inventions. The horizontal axis, in this exemplary embodiment, illustrates the 16 dij-to-eij conversion cells in "X" positions {0, 1, . . . 15}, and the 16 eij extraction cells in "X" positions {16, 17, . . . 31}. The lower axis shows the dij elements/values of the 4×4 D data block in their fixed position in the pipeline in registers DREG_X and DREG_Y. The 4×4 E data block passes left to right, and individual elements/values are accumulated into the eij elements. This accumulation is controlled by the pattern of "1" characters, with each "1" specifying the time and location of an accumulation. In this exemplary embodiment, there are a total of 64 accumulations needed to convert a 4×4 D block to a 4×4 E block. For example, at time T=9, the e23 element has d11 subtracted using the DREG_X register at the X=10 cell position.

With reference to FIGS. 2A, 2B and 4A, in one embodiment, F-to-H conversion logic is disposed in or incorporated into the execution pipeline circuitry to convert the filter weights or coefficients to Winograd format. In particular, FIG. 4A illustrates additional details of the F-to-H conversion logic, according to certain aspects of the present inventions, from FIGS. 2A and 2B. The memory (e.g., L2 SRAM memory) stores the 3×3 F blocks with filter weights or coefficients (e.g., finite impulse response (FIR) type). The memory, in this exemplary embodiment, may be segmented or divided into 16 physical blocks, so that 16 sets of data can be read or accessed in parallel by/for the 16 multiplier-accumulator execution pipelines of the multiplier-accumulator circuitry. Here, each set of data consists of four 3×3 F blocks which require 36 accesses from each physical L2 block, with each access requiring 1 ns in this example. The 3×3 F blocks are converted to 4×4 H blocks (in a Winograd format) by the conversion circuitry (in this illustrated embodiment, 16 fkl-to-hkl conversion logic circuits). These blocks may be written to memory (e.g., L1 SRAM memory) that is shared by the 16 multiplier-accumulator execution pipelines. Thereafter, each of the 16 hkl elements/values of a 4×4 H block are stored in memory (e.g., L0 memory, such as SRAM) of one of the 16 multiplier-accumulator execution pipelines of the multiplier-accumulator circuitry and available to the multiplier-accumulator circuitry of each of the execution pipelines for processing of the input data (e.g., image/pixel data).

In this exemplary embodiment, this sorting is performed by the addressing sequence when reading hkl elements/ values in the L1 memory and writing to hkl elements/values in memory (e.g., 16 L0 memories, which, in one embodiment is SRAM). Alternatively, however, the sorting may be done by an hkl extract logic circuitry, similar to the eij extract logic circuitry illustrated in FIG. 3A. Notably, the timing of the transfer between memory (e.g., from L2 memory to L1 memory and from L1 memory to the L0 memories) may not be as critical as the transfer of input and output data between memory (e.g., L2 memory) and the execution pipelines of the multiplier-accumulator circuitry. The weight values or data may be read from memory once and transferred to the pipelines of the multiplier-accumulator circuitry, and then used repeatedly for each of thousands of blocks of 2×2 input pixels.

FIG. 4C illustrates details for an exemplary embodiment of two cells of the fkl-to-hkl conversion circuitry, according to certain aspects of the present inventions. Notably, there is no extraction logic circuitry implemented here like the logic circuitry implemented in FIGS. 3A and 3D. The fkl-to-hkl conversion logic circuitry, in this exemplary embodiment, includes 16 of the left cell and 16 of the right cell. In addition, the fkl-to-hkl conversion logic circuitry includes (i) data registers for the fkl and hkl weight values, (ii) control logic for sequencing, and (iii) adder logic for the conversion (according to the conversion tables illustrated in FIG. 2D).

Note that the embodiment in FIG. 4C has an hkl accumulation path with 10 bits of precision and utilizes a saturating adder to handle overflow. (See FIG. 4D). An alternative embodiment (discussed in conjunction with FIG. 7A) uses an hkl accumulation path with 12 bits of precision and, as such, a saturating adder need not be included to handle overflow; that is, the 12 bit accumulation path may have enough numerical range to avoid overflow.

FIG. 4E illustrates a coarse diagram of the conversion/ extraction pipeline (horizontal axis) and the timing of the individual cells (vertical axis), according to certain aspects of the present inventions. In this exemplary embodiment, the horizontal axis shows the 32 fkl-to-hkl conversion cells of the conversion circuitry in "X" positions {0, 1, . . . 31}. The lower axis shows the fkl elements/values of the 3×3 F block in their fixed position in the pipeline in registers DREG_X and DREG_Y. The 4×4 H block passes left to right, and individual elements/values are accumulated into the hij elements/values. This accumulation is controlled by the pattern of "1/2/4" characters, with each "1/2/4" specifying the time and location of an accumulation. The value of the "1/2/4" characters specify a *1.0, *0.5 or *0.25 scaling factor, respectively. In this embodiment, there are a total of 64 accumulations employed to convert a 3×3 F block to a 4×4 H block. For example, at time T=0, the h23 element has 0.5*f12 subtracted using the DREG_X register at the X=1 cell position.

With reference to FIGS. 2A, 2B and 2C, in the second mode of operation, the N×N multiplier-accumulator execution pipelines of the multiplier-accumulator circuitry are employed to accumulate Q×Q pixel output data/values in a single output layer, in which each execution pipeline aggregates the sum of K multiplications of input data values and the associated input weight values for the K input layers. In one embodiment, the aggregation of the N×N element data/values for the Q×Q output data/pixels is implemented/performed external to the N×N multiplier-accumulator execution pipelines. Here, the N×N product data/elements are accumulated with other N×N product data/elements from other input layers—however, in this embodiment, the individual elements/values are accumulated together into the final Q×Q output data/pixels after performing a Z-to-Y-conversion logic operation on the accumulated N×N product data/elements. (See, FIG. 5A-5D).

Briefly, FIG. 5A illustrates additional detail of the Z-to-Y conversion circuitry illustrated in FIGS. 2A and 2B, according to certain aspects of the present inventions. In this exemplary embodiment, each of the 16 zij streams is directed from the z-shift-out block of one of the 16 multiplier-accumulator execution pipelines of the multiplier-accumulator circuitry. The 4×4 Z blocks may be assembled from 16 streams that are sorted by the individual zij elements/values of the 4×4 Z blocks, which may be implemented by the insertion logic circuitry (here, 16 zij insert logic circuitries). The 4×4 Z blocks are converted to 2×2 Y blocks by the zij-to-yij conversion logic circuitry. The memory (e.g., L2 SRAM memory) may store the 2×2 Y blocks (for example, in a segmented or divided form) into 16 physical blocks, so that 16 sets of data may be written or stored in parallel for the 16 multiplier-accumulator execution pipelines. Here, each set of data may consist of four 2×2 Y blocks, which would include 16 accesses from each physical block of memory (e.g., L2 SRAM memory), with each access including, for example, 1 ns in this exemplary embodiment.

Note that, in one embodiment, only ¼ of the available L2 SRAM memory is employed for writing the Y block data; the D block data and execution pipelines each employ a 64 ns pipeline cycle time to process the 16×64 4×4 D input blocks for each 2×2 pixel step. The lower Y access bandwidth for the L2 SRAM memory may facilitate the number of physical blocks of Y memory to be reduced from 16 to 4 in this exemplary embodiment.

Alternatively, however, the extra bandwidth may be used where there are more than 64 input planes being accumulated. For example, if there were 128 input planes (and 64 MAC elements/values per multiplier-accumulator execution pipeline of the multiplier-accumulator circuitry), the first 64 input planes may be accumulated into a particular region of the memory (e.g., the "Y" region of L2 SRAM memory). Then, as the second 64 input planes are accumulated in the multiplier-accumulator execution pipelines of the multiplier-accumulator circuitry, the Y values for the first planes are read from Y2 and passed to an accumulation port on the zij-to-yij conversion logic circuitry. The two sets of values may be added together and rewritten or stored to the Y region of L2 SRAM memory. This is illustrated in the path outlined by the dotted line in FIG. 5A labeled "V". (See also, FIG. 5E—which illustrates the accumulation of the first 64 input planes (also called layers here) in the left side of the figure of each schematic block diagram). The accumulation values are stored in the Y region of the L2 memory. The second set of 64 input planes is accumulated in the right side of the figure. The 4×4 Z block values pass through the zij-to-yij conversion logic circuitry before being written to the Y region of L2 memory. As they pass through the conversion logic, the Y accumulation values from the first 64 input planes are read from L2 and loading into the accumulation input port of the zij-to-yij conversion logic.

Notably, with reference to FIG. 5A, the read-modify-write (RMW) option may be used when the input layer depth DD is larger than the pipeline depth. For this option, the previously-written Yij group (four words labeled "64a") is read and passed to the accumulator input of the zij-to-yij converter to be added to the four words for the "64b" operation. This may be timeshared with the yij groups being written since only eight L2 memory cycles are needed out of each 16 (four yij write and four yij read).

FIG. 5C illustrates the detail for one cell of the zij insertion logic circuitry (left portion of the figure) and one cell the zij-to-yij conversion logic circuitry (right portion of the figure), according to certain aspects of the present inventions. The zij insertion logic circuitry includes (i) 16 of the left cell, (ii) data registers for the zij and yij data words, (iii) control logic for sequencing, and adder logic for the conversion (according to the conversion tables illustrated in FIG. 2F). It also includes the vertical "INSRT_IN" and "INSRT_OUT" ports which carry the inserted zij elements/values from the appropriate execution pipeline of the multiplier-accumulator circuitry. The zij insertion logic circuitry may also include an accumulation port (lower left portion of the illustration)—for example, where there are more input planes than execution pipelines or pipeline stages. The zij-to-yij conversion logic circuitry includes (i) 16 of the left cell, (ii) data registers for the dij and eij data words, (iii) control logic for sequencing, and (iv) adder logic for the conversion (according to the conversion tables illustrated in FIG. 2F). Note that some of the zij-to-yij conversion process may be implemented or performed in the zij insertion cells; notably, in certain embodiments (including the embodiment where some of the zij-to-yij conversion process is implemented in the insertion cells, the zij-to-yij insertion cells may include some of the same circuitry as the zij-to-yij conversion cells.

FIG. 5D illustrates a coarse diagram of the conversion/extraction pipeline (horizontal axis) and the timing of the individual cells (vertical axis), according to certain aspects of the present inventions. Here, the horizontal axis shows the 16 zij insertion cells in "X" positions {0, 1, . . . 15}, and the 16 zij-to-yij conversion cells in "X" positions {16, 17, . . . 31}. The lower axis illustrates the zij elements/values of the 4×4 Z block in their fixed position in the pipeline in registers ZREG_X and ZREG_Y. The 2×2 Y block passes left to right, and individual elements/values are accumulated into the yij elements. This accumulation may be controlled by the pattern of "1" characters, with each "1" specifying the time and location of an accumulation. There is a total of 36 accumulations needed to convert a 4×4 Z block to a 2×2 Y block. For example, at time T=0, the y01 element has z23 subtracted using the DREG_X register at the X=1 cell position.

Notably, with reference to FIGS. 1A, 1B, 2A and 2B, the output data/pixel groups are illustrated in the exemplary embodiment as 1×1 output pixel group (FIGS. 1A and 1B) and 2×2 output pixel groups (FIGS. 2A and 2B) rather than more generally as P×P and Q×Q arrays, respectively.

Briefly, with reference to FIG. 2C, the exemplary timing of the circuitry of the exemplary physical overview in FIG. 2B according to aspects of the present inventions, illustrates the operation of the 16 parallel multiplier-accumulator execution pipelines of the multiplier-accumulator circuitry and connection paths to memory. Here, each pair of waveforms illustrates the first and last of the 16 pipelines, with similar behavior from the middle 14 pipelines of the exemplary multiplier-accumulator execution pipelines of the multiplier-accumulator circuitry. In this exemplary embodiment, each operation group processes 16×64 input data words, corresponding to the 4×4 D block for each of the 64 layers—wherein each pipeline uses 64 clock cycles (e.g., each cycle may be 1 ns in this exemplary embodiment). The top waveforms illustrate the D blocks moving (via read and write operations) from memory (e.g., L2 SRAM memory) to the D-to-E conversion operation by the D-to-E conversion logic circuitry. This transport step has a pipeline latency of 16 ns; the conversion processes may begin when a portion of the data is available (here, when ¼ of the data is available).

Notably, some of the stages have a 16 ns pipeline latency, and a 64 ns pipeline cycle rate; in other words, in this exemplary embodiment, each stage may accept a new 16×64 word operation in each 64 ns interval, but may overlap 48 ns of its processing with the next stage. The D-to-E conversion operation (implemented by the D-to-E conversion circuitry) produces the 4×4 E blocks. The extract logic circuitry separates the 16 eij elements/values from each 4×4 block, passing each to one of the 16 execution pipelines. The 64 ns of 4×4 E blocks requires 64 ns to shift in—this stage (and the following two stages) have a pipeline latency and a pipeline cycle time are the same.

With continued reference to FIG. 2C, when the E blocks of input data have been shifted into or applied to the multiplier-accumulator circuitry of the multiplier-accumulator execution pipeline, the of the multiplier-accumulator pipelines, in combination, perform 16×64×64 MAC operations (labeled "MAC operations"). Here, the 64 multipliers and 64 adders of the multiplier-accumulator circuitry in each of 16 of the multiplier-accumulator pipelines each perform one operation per nanosecond over a 64 ns interval. This is the accumulation over the "K" and "L" indexes for the input planes and output planes. The 64 ns of 4×4 Z blocks requires 64 ns to shift out—this stage is able to overlap the Z-to-Y insertion stage by 48 ns. Likewise, the Z-to-Y conversion stage is able to overlap the L2 write stage by 48 ns. Each 2×2 pixel block consumes a pipeline cycle time of 64 ns—in the timing waveform, the next 2×2 block is shown in dark gray. Thus, the processing of all 128k pixels in this example will require 1 ms (~one million ns). In this exemplary embodiment, the entire 16×64 word operation has a pipeline latency of 18×16 ns, or 288 ns. The pipeline latency of 288 ns, in this exemplary illustration, is about 3,472 times smaller than the total operational latency of 1 ms, and thus has a relatively small impact on the overall throughput of the system.

With reference to FIG. 2D, briefly, there are nine fij elements/values comprising the 3×3 FIR (finite-impulse-response) filter matrix "F" illustrated in FIG. 2D. These elements/values are converted into the 4×4 "H" matrix with 16 elements/values hij. The upper left diagram of FIG. 2D illustrates the details of this conversion. Each hij element is created by summing from one to nine of the fij elements. The black text on a white background indicates "add", the white text on a black background indicates "subtract". Some of the elements/values are scaled by ½ or ¼.

With reference to FIG. 2E, in one embodiment, each 2×2 input pixel/data block "D" is processed into a 2×2 output block. The 2×2 input data block is surrounded by a ring of 12 adjacent pixels that will be used for the filter operation, but which will themselves be processed in a different step of the iteration loop. Thus, there are 16 elements/values dij comprising the 4×4 input data block "D". These values/elements are converted into the 4×4 "E" matrix with 16 elements eij. Each eij element is created by summing four of the dij elements. The black text on white background indicates "add", the white text on black background indicates "subtract".

With reference to FIG. 2F, in this embodiment, the 4×4 "H" matrix and the 4×4 input data block "D" are multiplied together, element-by-element (value-by-value) into a 4×4 output block "Z" with 16 zij elements. These elements are converted into the 2×2 "Y" matrix with 4 elements/values yij. The lower left diagram in the figure shows the details of this conversion. Each yij element is created by summing nine of the zij elements. The black text on white background indicates "add", the white text on black background indicates "subtract". These yij elements/values are the accumulated into the 2×2 output pixel block, along with the yij elements/values generated from input blocks with pixels belonging to other input planes.

Note that the 4×4 output block "Z" generated in the multiplier-accumulator execution pipeline is not immediately accumulated into the 2×2 output pixels (like in the 3×3 filter of the first mode of operation of the execution pipeline—see FIGS. 1A and 1B and text associated therewith) when the zij-to-yij conversion occurs in a converter block between the execution pipeline and the memory (as in the first embodiment). This means that each execution pipeline operates on just one of the 4×4 elements, with 16 associated execution pipelines of the multiplier-accumulator circuitry operated concurrently or together to process the entire 4×4 block.

Notably, the memory employed to store the data may be, for example, a block or an array of dynamic and/or static random access memory cells such as DRAM, SRAM, Flash and/or MRAM; notably, all memory types, and combinations thereof, are intended to fall within the scope of the present inventions). In one embodiment, a third and/or fourth memory stores the input data, input weight values and the output data values in SRAM (e.g., third memory, e.g., L2 SRAM memory) and/or DRAM (e.g., fourth memory, L3 DRAM memory). In addition, a third and/or fourth memory may store the transformed input data (after the input data undergoes transformation via the D-to-E conversion logic operation) of the N×N arrays of input or image data/pixels. In one embodiment, the "D" input data and "Y" output data may both be stored in the third (L2 SRAM) memory—each piece of data participates in different multiplier-accumulate (MAC) operations (e.g., 64 different MAC operations), so the more-limited L2 memory bandwidth is adequate for the much-higher bandwidth of the multiplier-accumulator execution pipeline. In contrast, the weight data bandwidth that is required by the execution pipeline is much higher, and it is necessary to store such data in the first and/or second memory SRAM (e.g., L0 SRAM memory and L1 SRAM memory) which, in one embodiment, may be reserved for: (i) the "F" weight values for first mode of operation of the N×N multiplier-accumulator execution pipelines of the multiplier-accumulator circuitry or (ii) the "H" weight values for second mode of operation of the N×N multiplier-accumulator execution pipelines of the multiplier-accumulator circuitry.

As mentioned above, in one embodiment, the D-E conversion operation and/or the Z-Y conversion operation may be performed separately (and not on-the-fly)—although such an implementation may require additional read/write operations (e.g., more 2× more read/write operations for the L2 operation), which may also increase the capacity requirements of memory (e.g., the third memory (L2 SRAM memory)).

Where the filter weight or coefficients are transformed on the fly (i.e., during operation of the multiplier-accumulator execution pipeline), the first and second memory may also store the transformed weight values or data. In one embodiment, the third and/or fourth memory may also be, for example, a block or an array of dynamic and/or static random access memory cells such as DRAM, SRAM, Flash and/or MRAM; indeed, all memory types, and combinations thereof, are intended to fall within the scope of the present inventions). In a preferred embodiment, the first and/or second memory is SRAM (e.g., L0 SRAM memory and L1 SRAM memory).

Notably, in the illustrative embodiments set forth herein (text and drawings), the multiplier-accumulator execution pipeline (which includes multiplier-accumulator circuitry) is, at times, labeled "NMAX" or "NMAX pipeline" or "MAC pipeline".

With reference to FIGS. 6A, 6B and 6C, in another embodiment, the architecture incorporates the D-to-E conversion logic/circuitry and Z-to-Y conversion logic/circuitry to, or performs the operations thereof in, the multiplier-accumulator execution pipeline. That is, in one embodiment of this architecture, the input data, which is stored in memory (e.g., in layers consisting of two-dimensional M×M arrays of image data/pixels), is read by the multiplier-accumulator execution pipeline from memory and undergoes transformation or is converted (e.g., to an N×N matrix) within the pipeline. In this embodiment, however, the F-to-H conversion logic, or operation performed thereby, may be implemented before applying or providing the filter weights to multiplier-accumulator execution pipeline. That is, F-to-H conversion logic, in one embodiment, transforms or converts the M×M input weight blocks from an M×M matrix to an N×N matrix before applying or employing the filter weights in the multiplier-accumulator execution pipeline. Thereafter, the circuitry of each multiplier-accumulator pipeline processes the N×N input data using the associated N×N filter weights.

As noted above, in this embodiment, the Z-to-Y conversion logic is incorporated in the multiplier-accumulator execution pipeline. That is, the operations/processes of the Z-to-Y conversion circuitry are performed in the execution pipeline. The multiplier-accumulator circuitry may accumulate the individual elements/values of the N×N execute pipeline within the execution pipeline, so that the processing may be implemented via a single execution pipeline rather than N×N execution pipelines (e.g., 16 execution pipelines). As such, the individual elements/values are accumulated together into the final Q×Q output data/pixels in multiplier-accumulator execution pipeline. That is, in this embodiment, the accumulation of the individual elements/values of the N×N is implemented in the execution pipeline, so that a single execution pipeline (versus the N×N (e.g. 16) execution pipelines illustrated in FIGS. 2A and 2B) accumulates N×N product data/elements after Z-to-Y conversion operation.

With reference to FIGS. 6A and 6B, in this embodiment, the filter weights are converted or transformed before operation of the execution pipeline and stored in memory as N×N blocks. In this embodiment, the pre-processed and pre-transformed filter weights are read from memory by the multiplier-accumulator circuitry in the N×N block form. The multiplier-accumulator circuitry of each multiplier-accumulator execution pipeline employs the transformed weights or coefficients with the associated input data (that was transformed, on the fly, by the circuitry and techniques of the D-to-E conversion logic circuitry) from M×M blocks of input data to N×N blocks of input data) during operation and performance of the multiplier-accumulator circuitry/pipeline. Such weight conversion or transformation may be performed separately, by circuitry different from the circuitry of the present inventions (e.g., by an off-chip processor or computing system).

Where the input weight values are transformed on the fly (i.e., during operation of the execution pipeline), such weight values may again be stored in the first and/or second memory which, in a preferred embodiment, is SRAM (e.g., L0 SRAM memory and L1 SRAM memory).

Notably, FIG. 6A is a physical overview of the multiplier-accumulator execution pipelines of the multiplier-accumulator circuitry which employs the transformed or converted filter weights with the associated input data (which was transformed, on the fly (i.e., during operation of the multiplier-accumulator circuitry), by the circuitry and techniques of the D-to-E conversion logic circuitry) from M×M blocks of input data to N×N blocks of input data) during operation and performance of the multiplier-accumulator circuitry/pipeline. Here, the throughput may be the same as the 16 pipelines illustrated in FIG. 2B, which is accomplished by taking approximately the same number of multipliers and accumulators implemented, organized and/or configured in a different arrangement.

Further, FIG. 6B illustrates details of four slices of one pipeline stage wherein each of the four slices is processing one of the four input streams of the 4×4 input data blocks D (received from the right side in the figure). Here, the "H" inputs from the top receive the appropriate value of the 4×4 H filter matrix for the 4×4 multiplications. Moreover, the processing includes the D-to-E conversion (via conversion circuitry) with the "add3" block, the 4×4 element-by-element multiplication with the "mul" block, and the Z-to-Y conversion with the "add4" block. The output data blocks Y are passed to the left for further accumulation. Notably, the multiplier-accumulator execution pipelines of the multiplier-accumulator circuitry illustrated in FIG. 6B illustrate the "add3/mul/add4" blocks executing within a single pipeline cycle (for the purposes of clarity). In one embodiment, these operations are separated or divided into two or three cycles (with additional pipeline registers incorporated or implemented) and implemented by appropriate circuitry. This alternative may improve the execution rate, at the cost of making the sequencing slightly more complex.

FIG. 6C illustrates four of the slices of FIG. 6B aggregated into single block. This block is capable of accepting a 4×4 D block and 4×4 H block and producing a 2×2 Y block in each pipeline cycle (including the D-E and Z-Y conversion via appropriate circuitry). If 64 of the blocks in FIG. 6C are aggregated into a single execution path, it may provide the same or similar performance as the 16 pipelines of FIG. 2A (including the D-E and Z-Y conversion logic circuitry). Note, each of the 16 pipelines in FIGS. 1A and 1B contains multiplier-accumulator circuitry including 64 multiply/accumulate elements/circuits, so the total number of multiply elements/circuits in these two embodiments are similar (e.g., both structures contain 1024 multiplier elements/circuits).

Notably, the pseudo-code, operations, configurations, block/data width, data path width, bandwidths, data lengths, values, processes and/or algorithms described and/or illustrated in the FIGURES and text are merely exemplary. Indeed, the inventions are not limited to particular pseudo-code, operations, block/data width, data path width, bandwidths, values, processes and/or algorithms illustrated and/or implemented in accordance with, for example, the exemplary logical or physical overview configurations of the execution pipeline(s) and/or exemplary conversion circuitry.

With reference to FIG. 7A, it should be noted that where memory capacity is an issue, it may be advantageous to perform the conversion as the filter (weight) elements/values are moved from the L2 memory to the L1/L0 memories. The number of elements/values increases from nine to 16, increasing the capacity requirement of the L1/L0 memories. This may be a suitable implementation, since the L2 memory occupies far more chip area than the L1/L0 memories. This on-the-fly solution is also applied to D-to-E conversion and Z-to-Y conversion of the input and output data (see FIGS. 7B and 7C, respectively)—if the data was kept in E and Z form in the L2 memory, it would require 4× as much L2 capacity.

Another issue may be created by the accuracy of the 4×4 "H" matrix that is generated from the 3×3 "F" matrix. The format of the fij elements/values is typically an 8 bit signed integer. The conversion of fij elements/values to hij elements/values means that as many as nine 8 bit fij integers (scaled by ¼) must be added together into an hij element. The hij number format must be increased by two additional bits to reduce the chance of an overflow (if an overflow does occur, this can be detected ahead of time, and the convolutional neural network (CNN) stage can be handled with the first mode of operation). Further, it may be necessary to accommodate two fractional bits (with weight ½ and ¼) to handle the ¼ scaling operation during fij-to-hij conversion.

This increases the bit format to the three possible values. Four of the hij elements/values require a 12 bit signed integer format, eight of the hij elements/values require a 10b signed integer format, and four of the hij elements/values require an 8 bit signed integer format. This is an average of 10b per hij element. The L1/L0 memories can be designed for the 10 bit average case, with special sharing logic so that the extra two bits needed by the h11, h21, h12, h22 elements/values are stored in the memory cells of the h00, h03, h30, h33 elements. (See FIG. 7A). This reduces the storage area used in or needed by the L0/L1 memories.

Incremental precision may also be required in the data accumulation path, but these are typically already implemented with 16 bit and 32 bit signed integer precision for the input and output data values. Consequently, the existing formats can generally handle the additional two or four bits of precision range. If input or output overflow is a concern, and the format can't be extended by two and four bits, then the conversion and accumulation hardware can be enhanced with saturation logic added. When overflow occurs, some accuracy is lost, but the CNN result will be approximately the same.

Down-sampling may be an important operation that may be needed during CNN processing. This reduces the number of pixels in the input planes, as they are transferred to the output planes. Typically, there is an increase in the number of output planes, so the number of pixels in each stage stays approximately constant.

The present inventions may employ down-sampling processing/techniques. Briefly, with reference to FIG. 8, the down-sampling for the first mode of operation is illustrated on the left. Typically, ¼ of the pixels are filtered with the 3×3 filter operation to produce the output pixels. The remaining (unfiltered) input pixels are used to perform the 3×3 filter operation, but are not themselves filtered and written to the output planes. Note, for clarity purposes, the unwritten output positions are shown as white in the figure. In reality, the actual pixels are written into adjacent memory positions so that the output planes occupy contiguous regions of memory.

The down-sampling for the second mode of operation (i.e., implementing Winograd processing techniques) may not efficiently process the down-sampled case on the right, since it operates on 2×2 input pixel blocks. However, it can process ¼ of the 2×2 input blocks (dark pixels) as in the right side of the figure. In other words, ¼ of the pixels are filtered (dark pixels) with the 4×4 filter operation to produce the output pixels (dark pixels). The input pixels are used to perform the 4×4 filter operation, but are not themselves filtered and written to the output planes. Note that the unwritten output positions are shown as white in the figure—this is done to help clarify FIG. 8. Again, the actual pixels (dark pixels) are written to adjacent memory positions so that the output planes occupy contiguous regions of memory.

This alternate method of down-sampling reduces the number of pixels by ¼, and may be implemented in the second mode of operation in connection with the Winograd techniques. The different phasing for the sampling of the input pixels will require different training to get the weights adjusted so there is similar filtering functionality for the CNN stage. But the cost of this extra training effort may be offset by the improved performance of the down-sampled CNN stages.

Note that the same method could be applied to a CNN stage that is performing up-sampling—increasing the number of pixels per image plane. The sequencing for this would look like the down-sampling operation, but in reverse. The extra output pixels would be generated by interpolation of the adjacent pixels.

With reference to FIG. 9, with respect to the down-sampling operation, the addressing and sequencing logic for the execution pipeline manages the L2 memory that is reading the input 4×4 D blocks and writing the output 2×2 Y blocks. Here, stride=1 (no down-sampling) is illustrated on the left and stride=2 (down-sampling) is illustrated on the right.

With stride=1, a strip of input pixels (ΔDh×Dw) is read and converted into a stream of 4×4 D blocks. The blocks are converted to 4×4 E blocks, which are passed to the NMAX execution pipelines. The resulting 4×4 Z blocks are converted to 2×2 Y blocks, and are written to a strip of output pixels (ΔYh×Yw).

With modified stride=2, a strip of input pixels (ΔDh×Dw) is read and converted into a stream of 4×4 D blocks, but only half of the 2×2 pixel blocks are transferred; the control logic suppresses alternate 2×2 blocks.

The blocks are converted to 4×4 E blocks, which are passed to the NMAX execution pipelines. Again, only half of the 2×2 pixel blocks are transferred; the control logic suppresses alternate 2×2 blocks. The resulting 4×4 Z blocks are converted to 2×2 Y blocks. Again, only half of the 2×2 pixel blocks are transferred; the control logic suppresses alternate 2×2 blocks. The 2×2 output blocks are written to a strip of output pixels (ΔYh×Yw)—typically, the Yw width would scale by ½ so the output blocks are in a contiguous region (no gaps).

There are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations. As such, the embodiments, features, attributes and advantages of the inventions described and illustrated herein are not exhaustive and it should be understood that such other, similar, as well as different, embodiments, features, attributes and advantages of the present inventions are within the scope of the present inventions.

For example, although the illustrative embodiments, and the text associated therewith, describe and illustrate multiple memories (e.g., L3 memory, L2 memory, L1 memory, L0 memory), one or more of these memories may be omitted (for example, the L3 memory and/or L0 memory) and/or one or more of these memories may be combined/consolidated with one or more of the other memories (for example, the L3 memory may be incorporated into the L2 memory, L2 memory may be combined with L1 memory, and/or L1 memory may be combined with L0 memory). As such, the inventions are not limited to the illustrative embodiments set forth herein, including with respect to the different memories.

In addition, with reference to FIGS. 10A and 10B, the one or more integrated circuits include circuitry to enable and implement one of a plurality of operating modes including, for example, a first mode of operation (see, e.g., FIG. 1A or 1B)) and a second mode of operation (see, e.g., FIGS. 2A and 2B). For example, a mode or modal control signal "MODE" is output by mode control circuitry to enable the circuitry and techniques employed to implement the first mode of operation (see, e.g., FIGS. 1A and 1B)) wherein a single execution pipeline and/or each execution pipeline of the execution pipelines is employed to accumulate a 1×1 pixel output value in a single output layer by aggregating the sum of K×M×M multiplications of input data values and associated input weight values from K layers of input data. In one exemplary embodiment of the implementation of the first mode of operation, 64×(3×3) input pixels at dij, which determine the 64×(1×1) output pixels at yij, are all processed by a single execution pipeline.

As noted above, in the first mode of operation, a M×M (e.g., 3×3) multiply and accumulation is performed by the multiplier-accumulator circuitry of the multiplier-accumulator execution pipeline, resulting in the yij value (see FIG. 1B). In one embodiment, all of the image data of a set of data which correlates with/to or contributes to that single output data value is applied to or employed by one of the multiplier-accumulator execution pipeline in the generation of the yij value. The processing, as described above, may continue for each of the pixels of the plane. Moreover, each of the execution pipelines of the plurality of execution pipelines (see, e.g., FIG. 1B which illustrates one execution pipeline of the plurality) processes a separate set of all dij input pixels/data (in this exemplary embodiment, 64×(3×3)) that determine the associated yij output pixels/data (in this exemplary embodiment, 64×(1×1)).

The mode control signal may output a mode or modal control signal "MODE" to enable the circuitry and techniques employed to implement the second mode of operation (see, e.g., FIGS. 2A and 2B), including the conversion circuitry described in detail above. For example, the multiplier-accumulator circuitry of a plurality of the execution pipelines perform the accumulation of values Uijklm (from the Eijk*Hklm multiplies) from the input planes (index K), into the Zijlm values, as shown by the ΣK notation— wherein the N×N (e.g., 4×4) multiplication substitutes or replaces the M×M (e.g., 3×3) of the multiplier-accumulator circuitry illustrated in FIGS. 1A and 1B. That is, in one example of the second mode of operation, 64×(4×4) input pixels/data at dij, which determine the associated 64×(2×2) output pixels at yij, are processed by 16 execution pipelines. The multiplier-accumulator circuitry of the execution pipeline performs the plurality of multiplications (e.g., 16) and, in one embodiment, the accumulation operations are implemented or performed in the zij-to-yij conversion block whereby four output pixels at Yijl (2×2) are written to the output plane (in parallel with other Yijl 2×2 pixels written into the other output planes (other L index values)). Here, the multiplier-accumulator circuitry of a plurality of the execution pipelines, when enabled in this mode of operation, may incorporate one or more of the conversion circuitry in the data path (as needed) to perform the data processing operations, using a Winograd technique (e.g., as discussed herein).

In one embodiment, mode select circuitry may be one-time programmable; in another embodiment, the mode select circuitry is a more than one-time programmable (i.e., multiple times). The mode select circuitry may be programmed, for example, in situ (i.e., during operation of the integrated circuit), at manufacture, and/or at or during power-up, start-up, initialization, re-initialization, configuration, re-configuration or the like. For example, the mode select circuitry may receive mode select signals from internal or external circuitry (i.e., external to the one or more integrated circuits—for example, a host computer/processor) including one or more data storage elements (e.g., one or more memory cells, register, flip-flop, latch, block/array of memory), one or more input pins/conductors, a look-up table LUT (of any kind or), a processor or controller and/or discrete control logic. The mode select circuitry, in response thereto, may employ such signal(s) to enable or disable selected processing circuitry (as the case may be) and thereby implement (e.g., in situ and/or at or during power-up, start-up, initialization, re-initialization, configuration, re-configuration or the like) one of the modes of processing (e.g., Winograd techniques).

Indeed, the present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof.

Notably, various circuits, circuitry and techniques disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit, circuitry, layout and routing expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other formats and/or languages now known or later developed. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Indeed, when received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

Moreover, the various circuits, circuitry and techniques disclosed herein may be represented via simulations using computer aided design and/or testing tools. The simulation of the circuits, circuitry, layout and routing, and/or techniques implemented thereby, may be implemented by a computer system wherein characteristics and operations of such circuits, circuitry, layout and techniques implemented thereby, are imitated, replicated and/or predicted via a computer system. The present inventions are also directed to such simulations of the inventive circuits, circuitry and/or techniques implemented thereby, and, as such, are intended to fall within the scope of the present inventions. The computer-readable media corresponding to such simulations and/or testing tools are also intended to fall within the scope of the present inventions.

Notably, reference herein to "one embodiment" or "an embodiment" (or the like) means that a particular feature, structure, or characteristic described in connection with the embodiment may be included, employed and/or incorporated in one, some or all of the embodiments of the present inventions. The usages or appearances of the phrase "in one embodiment" or "in another embodiment" (or the like) in the specification are not referring to the same embodiment, nor are separate or alternative embodiments necessarily mutually exclusive of one or more other embodiments, nor limited to a single exclusive embodiment. The same applies to the term "implementation." The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein.

Further, an embodiment or implementation described herein as "exemplary" is not to be construed as ideal, preferred or advantageous, for example, over other embodiments or implementations; rather, it is intended convey or indicate the embodiment or embodiments are example embodiment(s).

Although the present inventions have been described in certain specific aspects, many additional modifications and variations would be apparent to those skilled in the art. It is therefore to be understood that the present inventions may be practiced otherwise than specifically described without departing from the scope and spirit of the present inventions. Thus, embodiments of the present inventions should be considered in all respects as illustrative/exemplary and not restrictive.

The terms "comprises," "comprising," "includes," "including," "have," and "having" or any other variation thereof, are intended to cover a non-exclusive inclusion, such that a process, method, circuit, article, or apparatus that comprises a list of parts or elements does not include only those parts or elements but may include other parts or elements not expressly listed or inherent to such process, method, article, or apparatus. Further, use of the terms "connect", "connected", "connecting" or "connection" herein should be broadly interpreted to include direct or indirect (e.g., via one or more conductors and/or intermediate devices/elements (active or passive) and/or via inductive or capacitive coupling)) unless intended otherwise (e.g., use of the terms "directly connect" or "directly connected").

The terms "a" and "an" herein do not denote a limitation of quantity, but rather denote the presence of at least one of the referenced item. Further, the terms "first," "second," and the like, herein do not denote any order, quantity, or importance, but rather are used to distinguish one element/circuit/feature from another.

In addition, the term "integrated circuit" means, among other things, any integrated circuit including, for example, a generic integrated circuit, processor, controller, state machine, gate array, SoC, PGA and/or FPGA. The term "integrated circuit" also means, for example, a processor, controller, state machine and SoC—including an embedded FPGA.

Further, the term "circuitry", means, among other things, a circuit (whether integrated or otherwise), a group of such circuits, one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays. The term "data" means, among other things, a current or voltage signal(s) (plural or singular) whether in an analog or a digital form, which may be a single bit (or the like) or multiple bits (or the like).

In the claims, the term "MAC circuit" means a multiplier-accumulator circuit of the multiplier-accumulator circuitry of the multiplier-accumulator pipeline. For example, a multiplier-accumulator circuit is described and illustrated in the exemplary embodiment of FIGS. 1A-1C of U.S. patent application Ser. No. 16/545,345, and the text associated therewith. Notably, however, the term "MAC circuit" is not limited to the particular circuit, logical, block, functional and/or physical diagrams, block/data width, data path width, bandwidths, and processes illustrated and/or described in accordance with, for example, the exemplary embodiment of FIGS. 1A-1C of U.S. patent application Ser. No. 16/545,345, which, as indicated above, is incorporated by reference.

Notably, the limitations of the claims are not written in means-plus-function format or step-plus-function format. It is applicant's intention that none of the limitations be interpreted pursuant to 35 USC § 112, ¶6 or § 112(f), unless such claim limitations expressly use the phrase "means for" or "step for" followed by a statement of function and void of any specific structure.

What is claimed is:

1. An integrated circuit comprising:
a plurality of multiplier-accumulator execution pipelines, each multiplier-accumulator execution pipeline includes multiplier-accumulator execution circuitry to perform a plurality of multiply and accumulate operations;
mode select circuitry, electrically coupled to the plurality of multiplier-accumulator execution pipelines, to configure the plurality of multiplier-accumulator execution pipelines to operate in a first mode or operate in a second mode, wherein:
in the first mode, the multiplier-accumulator circuitry of one multiplier-accumulator execution pipeline of the plurality of multiplier-accumulator execution pipelines is configured to: (i) receive image data of a first set of image data, (ii) process, using filter weights associated with the first set of image data, the first set of image data, via performing a plurality of multiply and accumulate operations, and (iii) generate output data corresponding to the processed image data; and
in the second mode, the mode select circuitry enables first conversion circuitry, a first plurality of multiplier-accumulator execution pipelines of the plurality of multiplier-accumulator execution pipelines, and second conversion circuitry, and:
the first conversion circuitry is configured to (i) receive image data, (ii) convert the image data to a Winograd format, (iii) and output a Winograd set of image data to the multiplier-accumulator execution circuitry of each multiplier-accumulator execution pipeline of the first plurality of multiplier-accumulator execution pipelines,
the multiplier-accumulator circuitry of each multiplier-accumulator execution pipeline of the plurality of multiplier-accumulator execution pipelines is coupled to an output of the first conversion circuitry and configured to (i) receive the Winograd set of image data from the first conversion circuitry, (ii) process, using filter weights associated with the received Winograd set of image data, the Winograd set of image data, via performing a plurality of multiply and accumulate operations, and (iii) generate output data, wherein the output data of each multiplier-accumulator execution pipeline are in a Winograd format, and
the second conversion circuitry is coupled to an output of each multiplier-accumulator execution pipeline of the first plurality of multiplier-accumulator execution pipelines to: (i) receive the output data from the multiplier-accumulator execution circuitry of each multiplier-accumulator execution pipeline of the first plurality of multiplier-accumulator execution pipelines and (ii) convert the output data therefrom to a non-Winograd format.

2. The integrated circuit of claim 1 further including:
memory to store image data and filter weights wherein the memory stores the image data as a plurality of M×M arrays of image data.

3. The integrated circuit of claim 2 wherein:
the first conversion circuitry is coupled to the memory to receive the image data and, in operation, converts the image data from the plurality of M×M arrays of image data to a plurality of N×N arrays of image data, wherein N and M are integers and N is greater than M, wherein the N×N arrays of image data are in the Winograd format.

4. The integrated circuit of claim 1 further including:
memory; and
third conversion circuitry, wherein the mode select circuitry electrically couples the third conversion circuitry between the memory and the first plurality of multiplier-accumulator execution pipelines in the second mode, and wherein the third conversion circuitry, in the second mode, is configured to receive filter weights from the memory, convert the filter weights to a Winograd format, and output the filter weights, in the Winograd format, to the first plurality of multiplier-accumulator execution pipelines.

5. The integrated circuit of claim 4 wherein:
the third conversion circuitry, in operation, converts the filter weights from a plurality of M×M arrays of data to a plurality of N×N arrays of data, wherein N and M are integers and N is greater than M, wherein the N×N arrays of image data are in the Winograd format.

6. The integrated circuit of claim 1 wherein:
the second conversion circuitry, in operation, receives the output data from each multiplier-accumulator execution pipeline of the first plurality of multiplier-accumulator execution pipelines in a Winograd format and converts the output data therefrom to the non-Winograd format, wherein the non-Winograd format is a floating point format.

7. The integrated circuit of claim 1 further including:
a first memory to store each set of image data and a second memory to store the filter weights and wherein the second memory stores the filter weights associated with each set of image data as a two-dimensional array of filter weights.

8. The integrated circuit of claim 7 further including:
third conversion circuitry, coupled to the second memory and the multiplier-accumulator execution circuitry of the first plurality of multiplier-accumulator execution pipelines, wherein, in the second mode, the third conversion circuitry is enabled to: (i) receive filter weights from the second memory, (ii) convert the filter weights to a Winograd format and (iii) output the filter weights in the Winograd format to the multiplier-accumulator execution circuitry of the first plurality of multiplier-accumulator execution pipelines.

9. The integrated circuit of claim 8 wherein:
the third conversion circuitry, in operation, receives the filter weights from the second memory in a floating point format.

10. The integrated circuit of claim 8 wherein:
the third conversion circuitry includes extraction circuitry.

11. The integrated circuit of claim 8 wherein:
the third conversion circuitry, in operation, converts the filter weights from a plurality of M×M arrays of data to a plurality of N×N arrays of data, wherein N and M are integers and N is greater than M and the filter weights, in the plurality of N×N arrays data, are in a Winograd format.

12. The integrated circuit of claim 1 wherein:
the second conversion circuitry, in the second mode, is enabled to convert the output data from the multiplier-accumulator circuitry of each multiplier-accumulator execution pipeline of the first plurality of multiplier-accumulator execution pipelines from a N×N array of data to a P×P array of data, wherein N and P are integers and N is greater than P and the output data, in the P×P array of data, are in the non-Winograd format.

13. The integrated circuit of claim 12 wherein:
the non-Winograd format is a floating point format.

14. The integrated circuit of claim 1 further including:
insertion circuitry, coupled between the second conversion circuitry and memory, wherein the mode select circuitry enables the insertion circuitry in the second mode.

15. The integrated circuit of claim 1 further including:
a first memory to store the image data, and
a second memory to store the filter weights, wherein:
the first conversion circuitry, in the second mode, is configured to (i) receive the image data, in a floating point format, from the first memory, (ii) convert the image data to the Winograd format, (iii) and output the Winograd set of image data to the multiplier-accumulator execution circuitry of each multiplier-accumulator execution pipeline of the first plurality of multiplier-accumulator execution pipelines.

16. The integrated circuit of claim 1 further including:
memory to store image data and filter weights wherein the memory includes:
first memory to store the image data as a plurality of M×M arrays of image data, and
second memory to store the filter weights as a plurality of M×M arrays of filter weights.

17. The integrated circuit of claim 16 wherein:
the first conversion circuitry is coupled to the first memory, and, in the second mode, is enabled to receive the image data and convert the image data from the plurality of M×M arrays of image data to a plurality of N×N arrays of image data, wherein N and M are integers and N is greater than M, wherein the N×N arrays of image data are in the Winograd format; and
the third conversion circuitry is coupled to the second memory, and, in the second mode, is enabled to receive the filter weights and convert the filter weights from the plurality of M×M arrays of filter weights to a plurality of N×N arrays of filter weights, wherein the N×N arrays of filter weights are in the Winograd format.

18. The integrated circuit of claim 17 wherein:
the first memory stores the image data in a floating point format and the second memory stores the filter weights in a floating point format.

* * * * *